(12) United States Patent
Menendez et al.

(10) Patent No.: US 12,252,935 B2
(45) Date of Patent: Mar. 18, 2025

(54) SHADE MOTOR WITH POWER SUPPLIED THROUGH BRACKETS

(71) Applicant: Crestron Electronics, Inc., Rockleigh, NJ (US)

(72) Inventors: Victor M. Menendez, Carrollton, TX (US); Michael Campagna, Woodcliff Lake, NJ (US); Charles R. Derk, Jr., Park Ridge, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 168 days.

(21) Appl. No.: 18/066,452

(22) Filed: Dec. 15, 2022

(65) Prior Publication Data

US 2023/0112345 A1 Apr. 13, 2023

Related U.S. Application Data

(63) Continuation-in-part of application No. 17/522,462, filed on Nov. 9, 2021, now Pat. No. 11,572,737, which is a continuation of application No. 16/245,464, filed on Jan. 11, 2019, now Pat. No. 11,268,322, which is a continuation-in-part of
(Continued)

(51) Int. Cl.
| | |
|---|---|
| *E06B 9/72* | (2006.01) |
| *A47H 5/14* | (2006.01) |
| *E06B 9/44* | (2006.01) |
| *E06B 9/50* | (2006.01) |
| *A47H 1/13* | (2006.01) |

(52) U.S. Cl.
CPC .............. *E06B 9/72* (2013.01); *E06B 9/44* (2013.01); *E06B 9/50* (2013.01); *A47H 1/13* (2013.01); *A47H 5/14* (2013.01)

(58) Field of Classification Search
CPC .................................... E06B 9/72; A47H 1/13
See application file for complete search history.

(56) References Cited

U.S. PATENT DOCUMENTS

| | | |
|---|---|---|
| 5,517,094 A | 5/1996 | Domel et al. |
| 5,603,371 A | 2/1997 | Gregg |
| 6,910,515 B2 | 6/2005 | Nien |

(Continued)

FOREIGN PATENT DOCUMENTS

WO    WO2023225271    11/2023

OTHER PUBLICATIONS

Colorlux, Aspen Double Honeycom, Comfortex Corporation, Feb. 1, 2020.

*Primary Examiner* — Robert Canfield
(74) *Attorney, Agent, or Firm* — Crestron Electronics, Inc.

(57) ABSTRACT

A battery-operated motorized roller shade that can be charged through an installation bracket. The roller shade comprises a roller tube, a motor and at least one battery disposed within the roller tube, and a motor head disposed at a terminal end of the roller tube having a motor head interface. The installation bracket comprises an installation bracket interface and an exterior wall comprising an installation bracket connector adapted to removably connect to and electrically interface with a power adapter. The motor head is adapted to removably attach to the installation bracket wherein the installation bracket provides electrical power to the at least one battery within the roller tube when the installation bracket is connected to the power adapter.

21 Claims, 14 Drawing Sheets

Related U.S. Application Data application No. 15/299,621, filed on Oct. 21, 2016, now Pat. No. 10,221,623.

(56) References Cited

U.S. PATENT DOCUMENTS

| | | | |
|---|---|---|---|
| 7,264,034 B2 | 9/2007 | Lin | |
| 7,389,806 B2 | 6/2008 | Kates | |
| 7,880,409 B2 | 2/2011 | Miller | |
| 9,371,687 B2* | 6/2016 | Yu | E06B 9/262 |
| 9,514,638 B2 | 12/2016 | Hall et al. | |
| 9,644,424 B2* | 5/2017 | Slivka | E06B 9/72 |
| 9,765,566 B1 | 9/2017 | Chen | |
| 9,797,191 B2 | 10/2017 | Huang | |
| 9,840,870 B2 | 12/2017 | Lu | |
| 10,221,620 B2 | 3/2019 | Michel et al. | |
| 10,240,391 B2 | 3/2019 | Watkins et al. | |
| 10,273,747 B2 | 4/2019 | Hall et al. | |
| 10,547,190 B2 | 1/2020 | Hall et al. | |
| 10,847,983 B2 | 11/2020 | Nien et al. | |
| 11,146,085 B2 | 10/2021 | Nien et al. | |
| 11,203,899 B2 | 12/2021 | Pereira | |
| 11,223,218 B2 | 1/2022 | Nien et al. | |
| 11,268,322 B2* | 3/2022 | Campagna | E06B 9/50 |
| 11,293,224 B2 | 4/2022 | Pereira | |
| 11,686,151 B2* | 6/2023 | Graybar | E06B 9/42 |
| | | | 160/310 |
| 2004/0129849 A1* | 7/2004 | Walker | E06B 9/72 |
| | | | 248/266 |
| 2004/0169490 A1 | 9/2004 | Heurtault | |
| 2007/0066112 A1* | 3/2007 | Tufano | H01R 33/0854 |
| | | | 439/239 |
| 2007/0107854 A1 | 5/2007 | Jelic | |
| 2010/0059341 A1* | 3/2010 | Itoh | H02K 7/1012 |
| | | | 439/348 |
| 2014/0224437 A1* | 8/2014 | Colson | E06B 9/78 |
| | | | 160/311 |
| 2014/0262077 A1* | 9/2014 | Watkins | E06B 9/68 |
| | | | 160/310 |
| 2015/0008801 A1* | 1/2015 | Schadlich | E06B 9/72 |
| | | | 310/68 B |
| 2015/0362896 A1* | 12/2015 | Feldstein | G05B 11/01 |
| | | | 700/275 |
| 2018/0106102 A1 | 4/2018 | Holt | |
| 2018/0106105 A1* | 4/2018 | Anthony | H02P 1/22 |
| 2018/0112463 A1* | 4/2018 | Derk, Jr. | E06B 9/44 |
| 2018/0202224 A1 | 7/2018 | Kumar | |
| 2018/0298682 A1* | 10/2018 | Huang | E06B 9/262 |
| 2018/0310745 A1 | 11/2018 | Giri et al. | |
| 2019/0024452 A1* | 1/2019 | Derk, Jr. | E06B 9/42 |
| 2019/0162022 A1* | 5/2019 | Geiger | E06B 9/68 |
| 2019/0218859 A1* | 7/2019 | Campagna | E06B 9/90 |
| 2020/0071995 A1* | 3/2020 | Campagna | E06B 9/264 |
| 2020/0131849 A1* | 4/2020 | Campagna | H02K 29/08 |
| 2020/0284093 A1* | 9/2020 | Dahlgren | E06B 9/72 |
| 2021/0131179 A1* | 5/2021 | Campagna | E06B 9/72 |
| 2021/0172247 A1 | 6/2021 | Nien | |
| 2021/0172249 A1* | 6/2021 | Campagna | H02K 11/24 |
| 2021/0262286 A1* | 8/2021 | Campagna | E06B 9/60 |
| 2023/0026461 A1 | 1/2023 | Geiger | |
| 2023/0121526 A1* | 4/2023 | Campagna | E06B 9/72 |
| | | | 318/400.14 |
| 2023/0151690 A1* | 5/2023 | Menendez | E06B 9/42 |
| | | | 318/255 |
| 2023/0228147 A1* | 7/2023 | Derk, Jr. | E06B 9/42 |
| | | | 160/321 |

* cited by examiner

SHADE MOTOR WITH POWER SUPPLIED THROUGH BRACKETS

BACKGROUND OF THE INVENTION

Technical Field

Aspects of the embodiments described herein generally relate to battery-operated motorized roller shades, and more specifically to systems, methods, and modes for a battery-operated motorized roller shade that can be conveniently charged through an easily accessible and aesthetically pleasing installation bracket.

Background Art

Motorized roller shades provide a safe and convenient one-touch control solution for screening windows, doors, or the like, to achieve privacy and thermal effects without the use of hanging cords. A motorized roller shade typically includes a rectangular shade material attached at one end to a cylindrical rotating tube, called a roller tube, and at an opposite end to a hem bar. The shade material is wrapped around the roller tube and an electric motor, either mounted inside the roller tube or externally coupled to the roller tube, rotates the roller tube to unravel the shade material to selectively cover a window.

Motorized roller shades require local power to be provided to the shade to energize the motor and associated electronics, such as the radio, control circuitry, and encoders, among other components. Power is typically supplied using power over Ethernet (PoE) wiring, or a local power supply, such as a 24V wall-wart, which may be unsightly and/or challenging to install. In many installations, it may be difficult or impossible to run power and communication wires to a specific location, especially in retrofit applications. Battery powered roller shades with radio transceivers for communication provide means to easily install and control a roller shade without running new wires. Batteries may be housed inside the roller tube or the roller shade housing out of site from the end user. Since battery replacement is a cumbersome and difficult exercise, roller shades are provided with rechargeable batteries. These also, however, present a challenge as a physical connection is needed to recharge the batteries from a power supply to the shade's motor that may be difficult to access. Charging ports are typically located on the motor head of the roller shade and are difficult to access due to space constrains as well as being located at the top of the window. If the window's height exceeds one's reach, and often does, then a step stool or ladder is required to plug the power supply into the shade motor's charging port. While solutions exist consisting of charging wands that can provide access to charging ports, such charging wands need to either be connected to bulky roller shade housing, or to wired extension ports that are unsightly.

Therefore, a need has arisen for systems, methods, and modes for a battery-operated motorized roller shade that can be conveniently charged through an easily accessible and aesthetically pleasing installation bracket.

SUMMARY OF THE INVENTION

It is to be understood that both the general and detailed descriptions that follow are explanatory only and are not restrictive of the embodiments.

It is an object of the embodiments to substantially solve at least the problems and/or disadvantages discussed above, and to provide at least one or more of the advantages described below.

It is therefore a general aspect of the embodiments to provide systems, methods, and modes for a battery-operated motorized roller shade that can be conveniently charged through an easily accessible and aesthetically pleasing installation bracket.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to an aspect of the embodiments, a shade assembly is provided comprising a roller tube, a shade material connected to the roller tube, a motor disposed inside the roller tube and adapted to rotate the roller tube to roll and unroll the shade material, a motor head disposed at a terminal end of the roller tube and comprises a motor head interface, and at least one battery disposed inside the roller tube and electrically connected to the motor and to the motor head interface, wherein the motor head is stationary with respect to the installation bracket when the roller tube rotates. The shade assembly further comprises an installation bracket adapted to be secured to an architectural structure and comprises an installation bracket interface electrically connected to an installation bracket connector, wherein the installation bracket interface is adapted to removably connect to and electrically interface with the motor head interface, wherein the installation bracket connector is adapted to removably connect to and electrically interface with a power adapter. The motor head is adapted to removably attach to the installation bracket and wherein the installation bracket is adapted to provide electrical power to the at least one battery when the installation bracket is connected to the power adapter.

According to an embodiment, the motor head interface comprises a plurality of pins and wherein the installation bracket interface comprises a plurality of contact pads or receptacles. According to another embodiment, the motor head interface comprises a plurality of contact pads or receptacles and wherein the installation bracket interface comprises a plurality of pins. According to another embodiment, the motor head interface and installation bracket interface comprise a plug and receptacle interface. The plug and receptacle interface may comprise at least one of a USB interface, a power jack interface, and a terminal block interface.

According to another embodiment, the motor head comprises a first locking member and the installation bracket comprises a second locking member, wherein the motor head is adapted to removably attach to the installation bracket by connecting the first locking member to the second locking member and thereby aligning and electrically connecting the motor head interface with the installation bracket interface. According to an embodiment, the first locking member comprises at least one mounting plug and the second locking member comprises at least one mounting receptacle. According to another embodiment, the second locking member comprises a keyed mounting receptacle and the first locking member comprises at a mounting plug sized and shaped to fit within the keyed mounting receptacle. According to an embodiment, the motor head interface comprises a plurality of electrical contacts disposed about an outer perimeter of the mounting plug, and the installation bracket interface comprise a plurality of electrical contacts disposed about an inner perimeter of the keyed mounting receptacle. According to another embodiment, the first locking member comprises a disc shaped body and the second locking member comprises a disc shaped receiving area sized to receive the disc shaped body of the first locking member. According to an embodiment, the motor head is adapted to removably attach to the installation bracket by aligning the first locking member with the second locking member and rotating the roller tube until the first locking member is locked by the second locking member.

According to an embodiment, the shade assembly further comprises a controller disposed inside the roller tube and electrically connected to the battery and the motor head interface. According to one embodiment, the controller is adapted to monitor the battery and transmit a battery state signal and the installation bracket further comprises a light indicator adapted to illuminate a battery state based on receiving the battery state signal. According to another embodiment, the installation bracket further comprises a user interface, wherein the controller receives data signals from the user interface through the motor head interface and the installation bracket interface.

According to an embodiment, the installation bracket connector comprises a receptacle. The receptacle may comprise at least one of a USB receptacle and a power jack receptacle. According to an embodiment, the installation bracket comprises an outer side wall and a peripheral wall laterally extending from the outer side wall, wherein the peripheral wall comprises an opening through which the installation bracket connector is accessed. According to an embodiment, the opening comprises a magnet adapted to removably connect the power adapter to the power adapter connector of the installation bracket. According to another embodiment, the installation bracket comprises a rear wall laterally extending from a rear end of the outer side wall, wherein the rear wall is adapted to be secured to the architectural structure. According to a further embodiment, the installation bracket comprises a support bracket and an endcap cover, wherein the endcap cover comprises the outer side wall and the peripheral wall, and wherein the support bracket comprises a side wall and a rear wall laterally extending from a rear end of the side wall, wherein the rear wall is adapted to be secured to the architectural structure and wherein the side wall is adapted to removably attach to and support the motor head.

According to another aspects of the embodiments, a shade assembly is provided comprising a shade drive unit adapted to raise and lower shade material and an installation bracket adapted to be secured to an architectural structure. The shade drive unit comprises a motor, at least one battery electrically connected to the motor, and a motor head disposed at a terminal end of the shade drive unit, wherein the motor head comprises a first locking member and a motor head interface. The installation bracket comprises a second locking member, an installation bracket interface, and a peripheral wall comprising an installation bracket connector electrically connected to the installation bracket interface, wherein the installation bracket connector is adapted to removably connect to and electrically interface with a power adapter. The motor head is adapted to removably attach to the installation bracket by connecting the first locking member to the second locking member and thereby aligning and electrically connecting the motor head interface with the installation bracket interface, and wherein the installation bracket is adapted to provide electrical power to the at least one battery when the installation bracket is connected to the power adapter.

According to yet another aspect of the embodiments a roller shade assembly is provided comprising a roller shade adapted to raise and lower shade material and an installation bracket adapted to be secured to an architectural structure. The roller shade comprises a roller tube, a motor and at least one battery disposed within the roller tube, and a motor head disposed at a terminal end of the roller tube, wherein the motor head comprises a first locking member and a motor head interface, wherein the motor head is stationary with respect to the installation bracket when the roller tube rotates. The installation bracket comprises a second locking member, an installation bracket interface, and an exterior wall comprising an installation bracket connector electrically connected to the installation bracket interface, wherein the installation bracket connector is adapted to removably connect to and electrically interface with a power adapter. The motor head is adapted to removably attach to the installation bracket by connecting the first locking member to the second locking member and thereby aligning and electrically connecting the motor head interface with the installation bracket interface, and wherein the installation bracket is adapted to provide electrical power to the at least one battery when the installation bracket is connected to the power adapter.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

Figure 1:
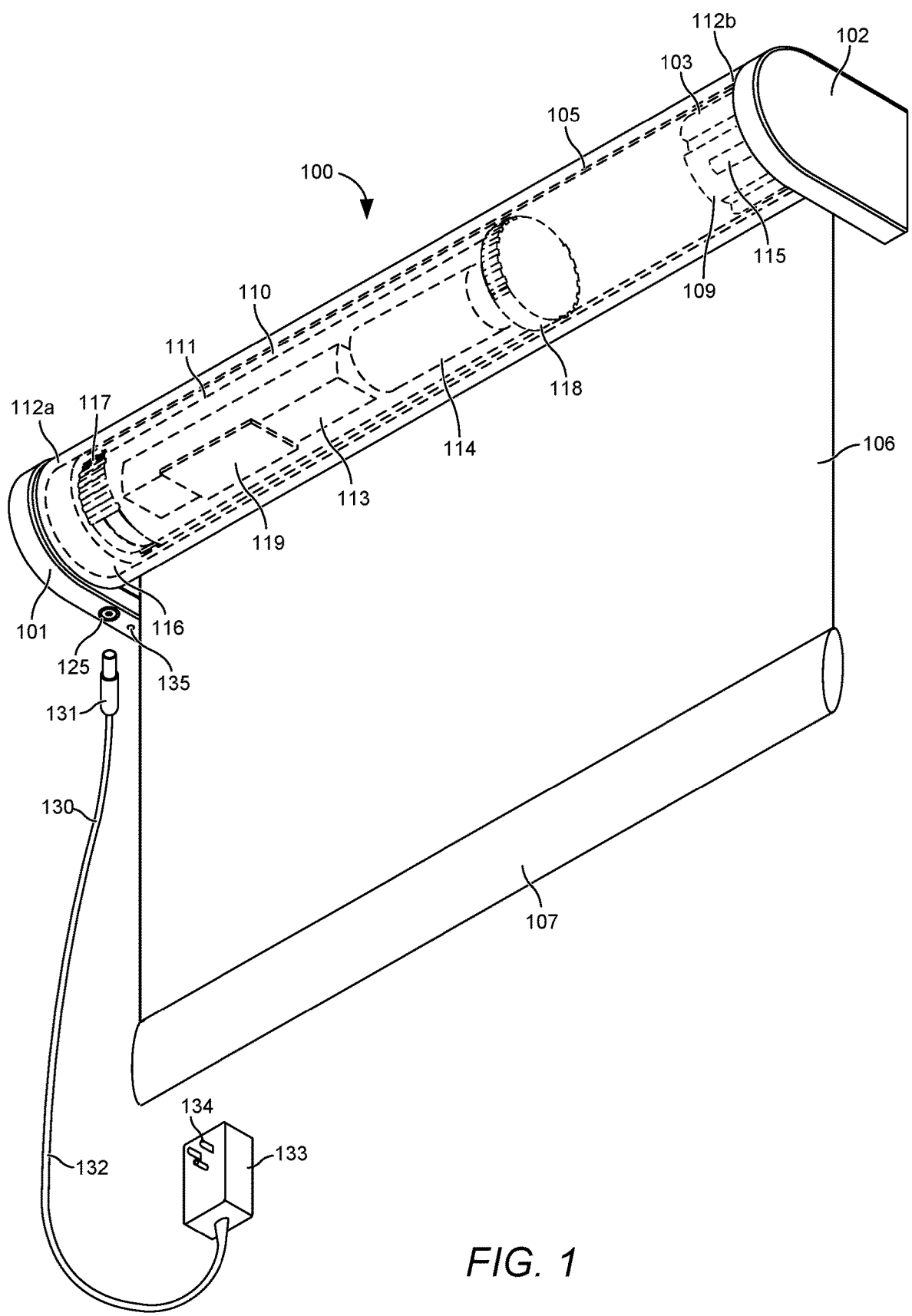

Brief Description of the Several Views of the Drawing

FIG. 1 illustrates a front perspective view of an installation bracket and roller shade assembly according to aspects of the embodiments.

Figure 2:
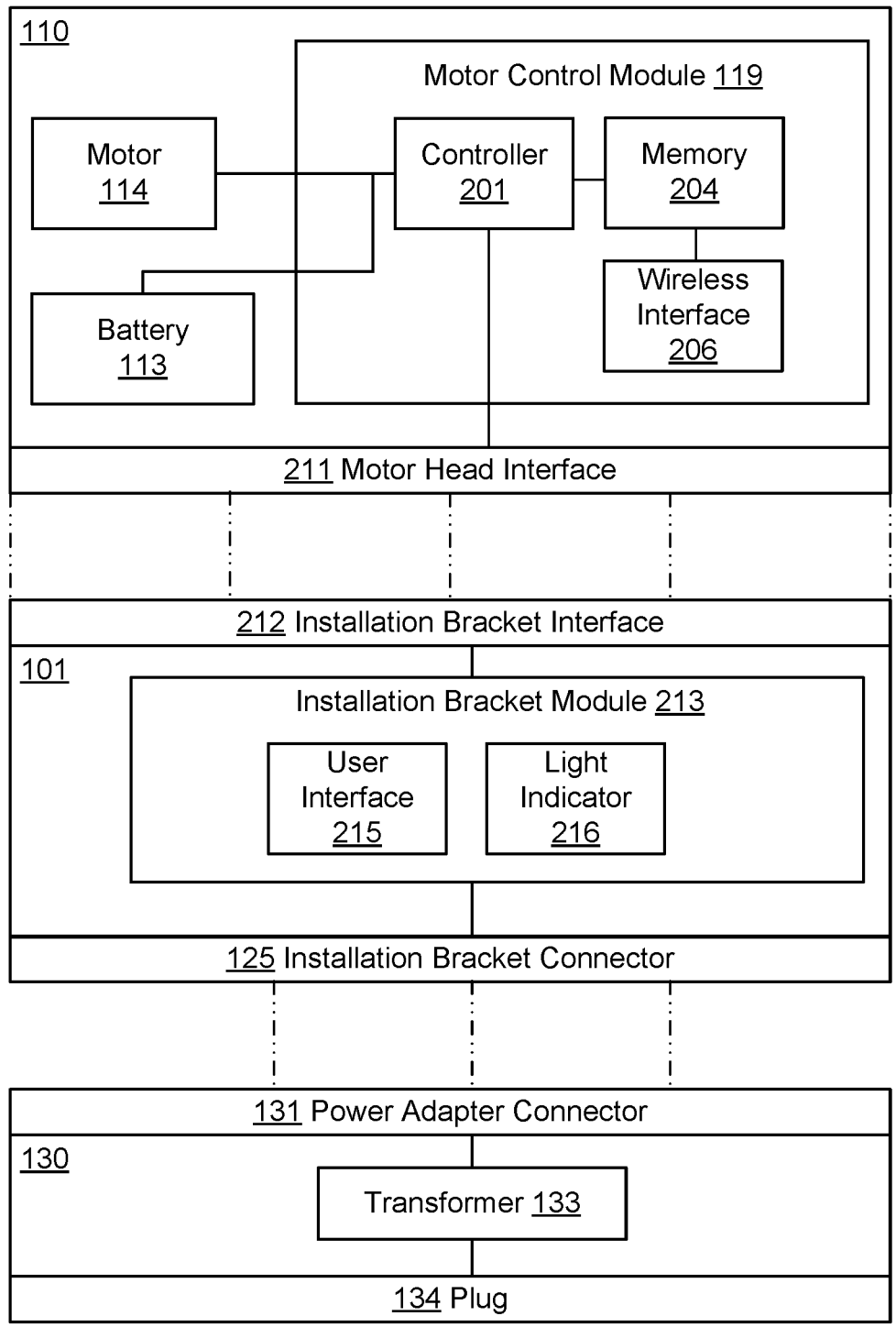

FIG. 2 shows an illustrative block diagram of the motor drive unit of the roller shade assembly, the installation bracket, and a power adapter according to aspects of the embodiments.

Figure 3A:
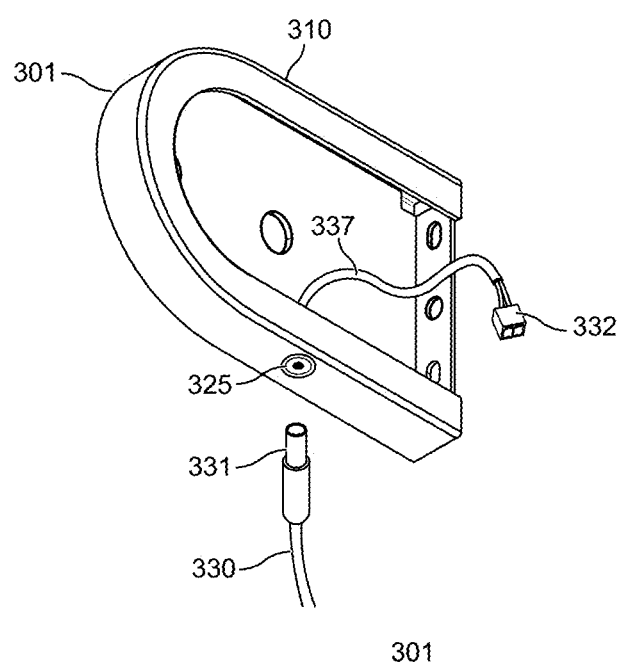

FIG. 3A illustrates a perspective inner view of an installation bracket according to an aspect of the embodiments.

Figure 3B:
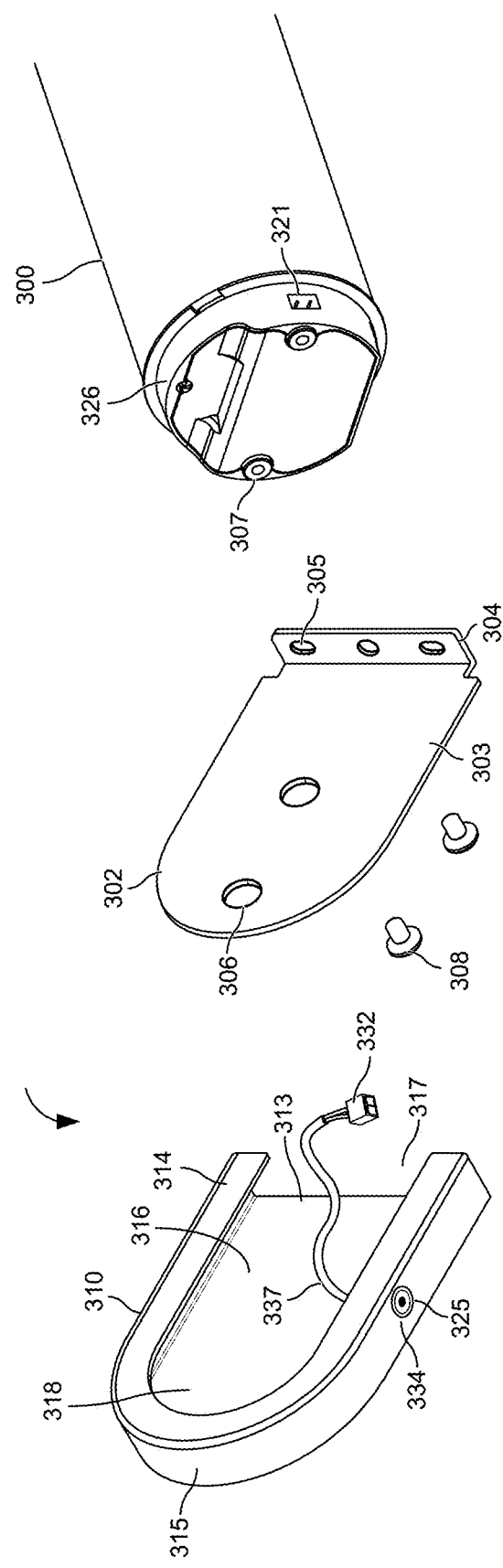

FIG. 3B illustrates an exploded view of the installation bracket of FIG. 3A relative to a roller shade assembly according to an aspect of the embodiments.

Figure 4A:
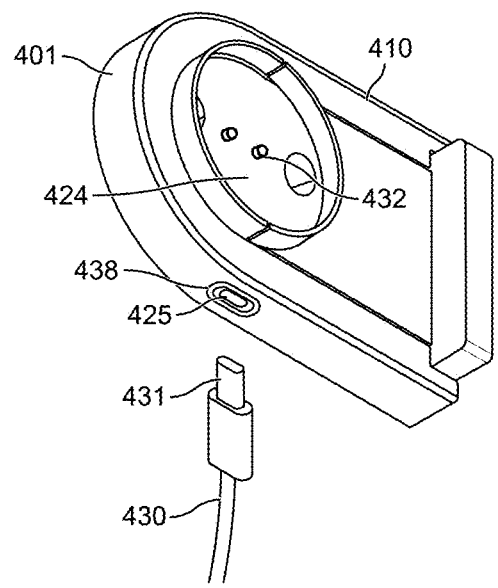

FIG. 4A illustrates a perspective inner view of an installation bracket according to another aspect of the embodiments.

Figure 4B:
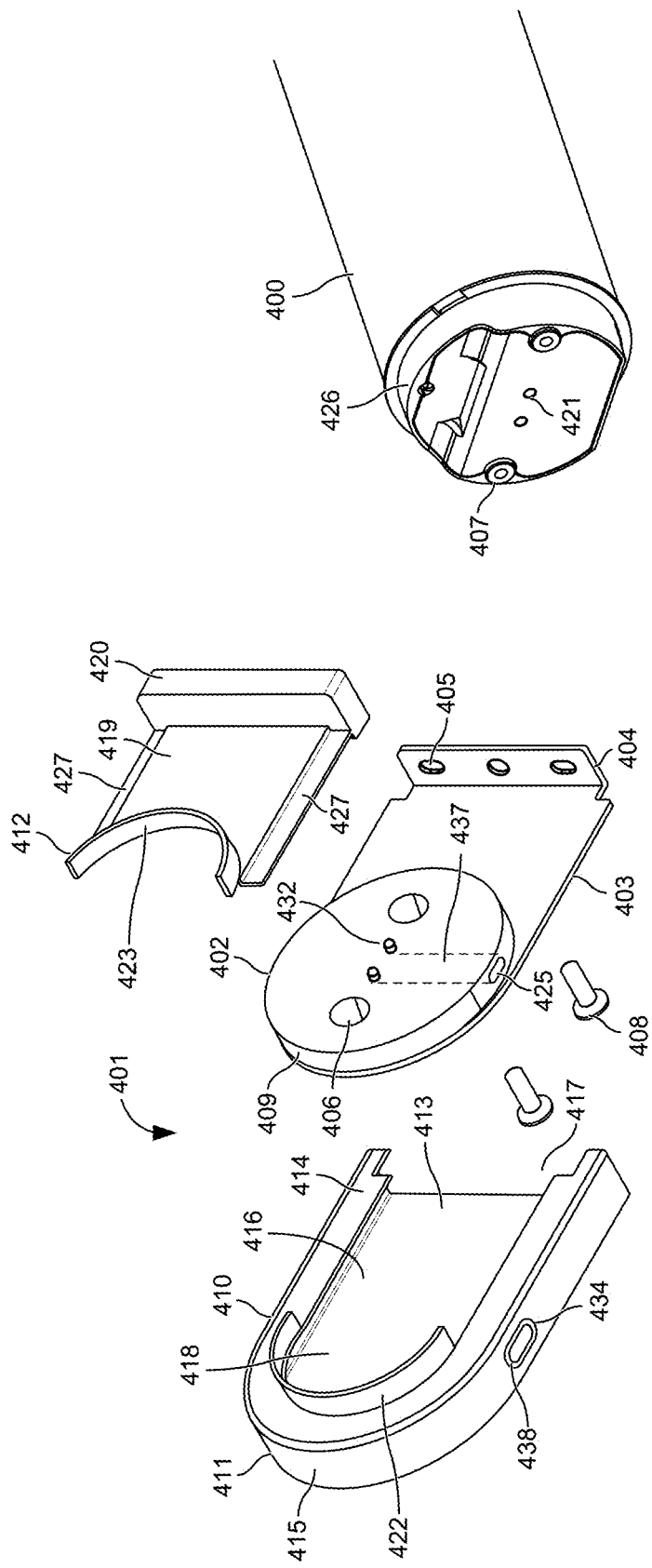

FIG. 4B illustrates an exploded view of the installation bracket of FIG. 4A relative to a roller shade assembly according to another aspect of the embodiments.

Figure 5A:
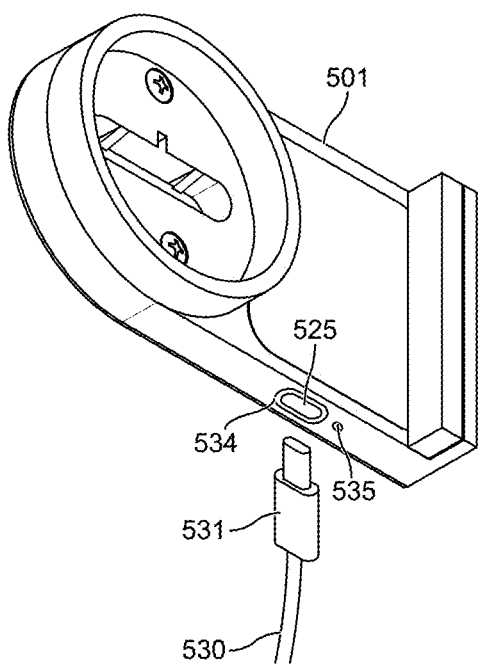

FIG. 5A illustrates a perspective inner view of an installation bracket according to another aspect of the embodiments.

Figure 5B:
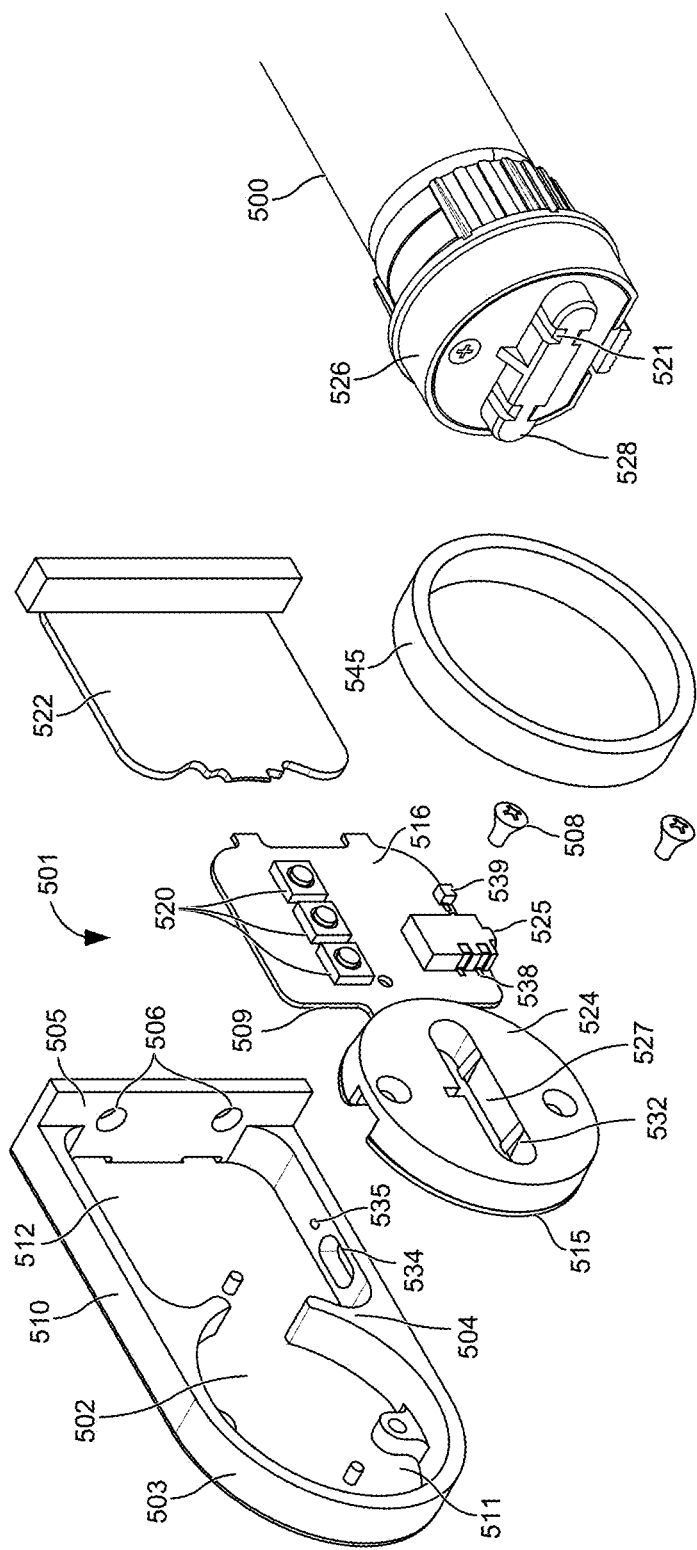

FIG. 5B illustrates an exploded view of the installation bracket of FIG. 5A relative to a roller shade assembly according to another aspect of the embodiments.

Figure 6A:
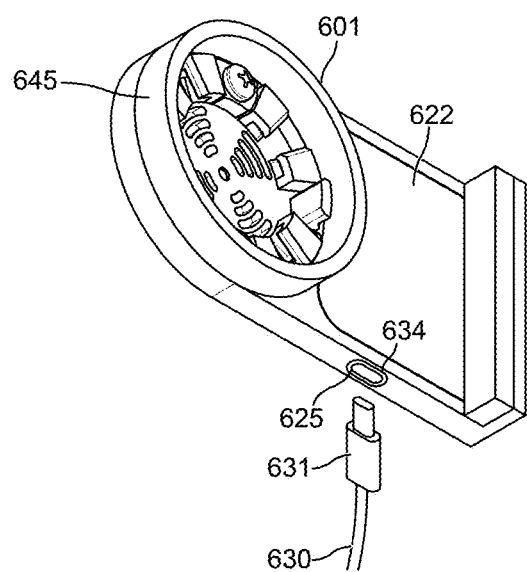

FIG. 6A illustrates a perspective inner view of an installation bracket according to another aspect of the embodiments.

Figure 6B:
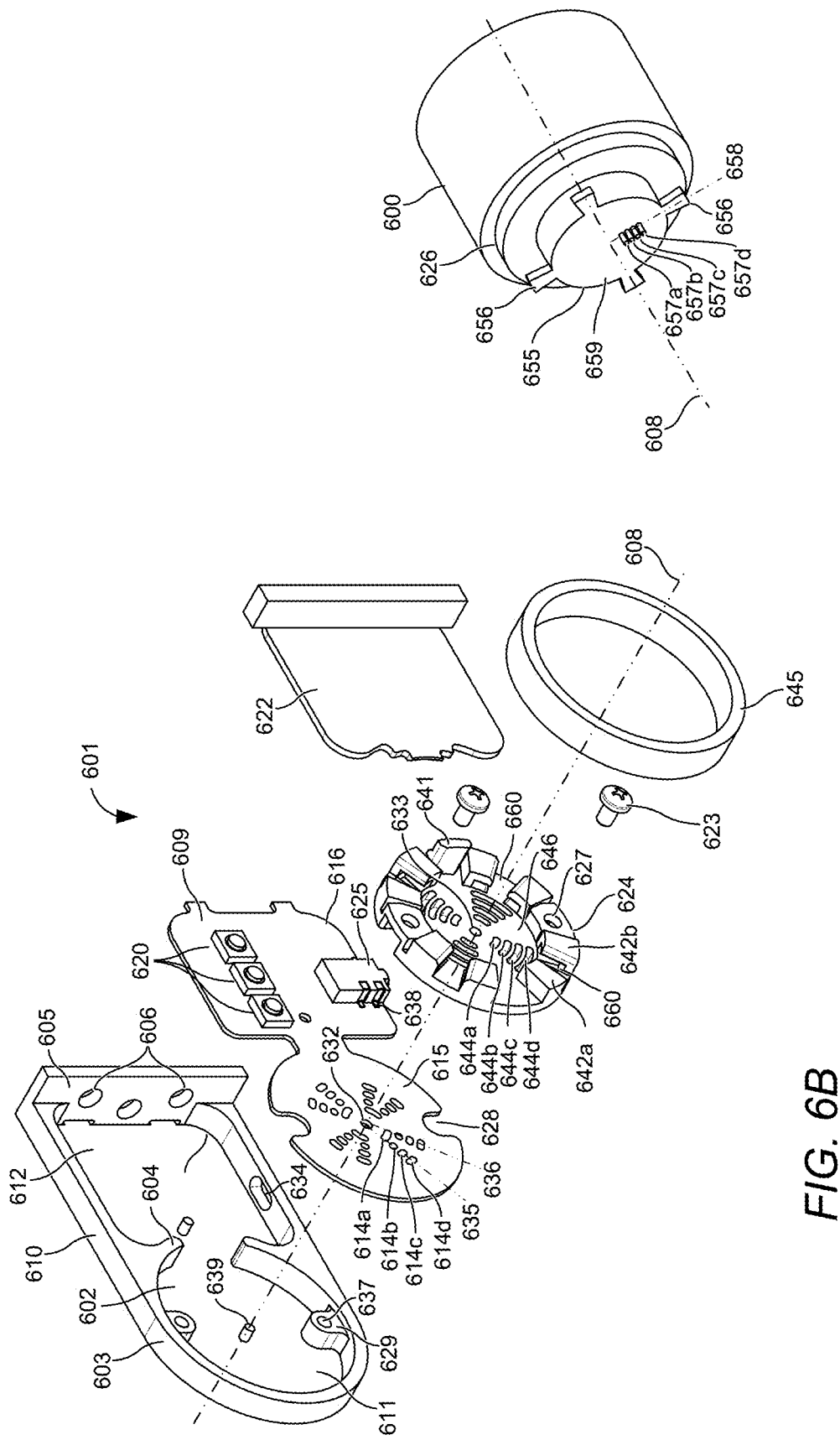

FIG. 6B illustrates an exploded view of the installation bracket of FIG. 6A relative to a roller shade assembly according to another aspect of the embodiments.

Figure 6C:
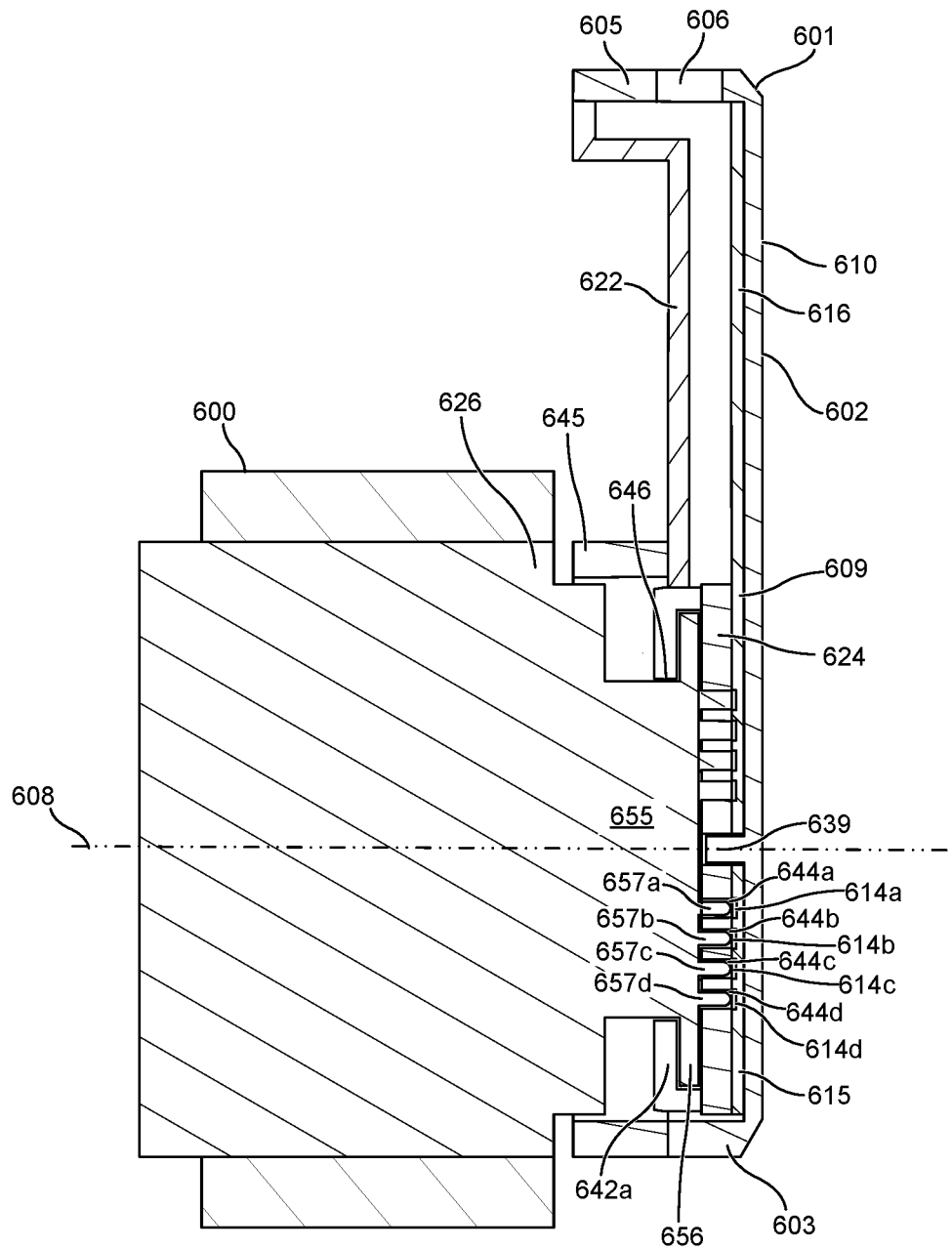

FIG. 6C illustrates a cross sectional view of the motor head of the roller shade assembly connected to the installation bracket of FIG. 6A according to another aspect of the embodiments.

Figure 7A:
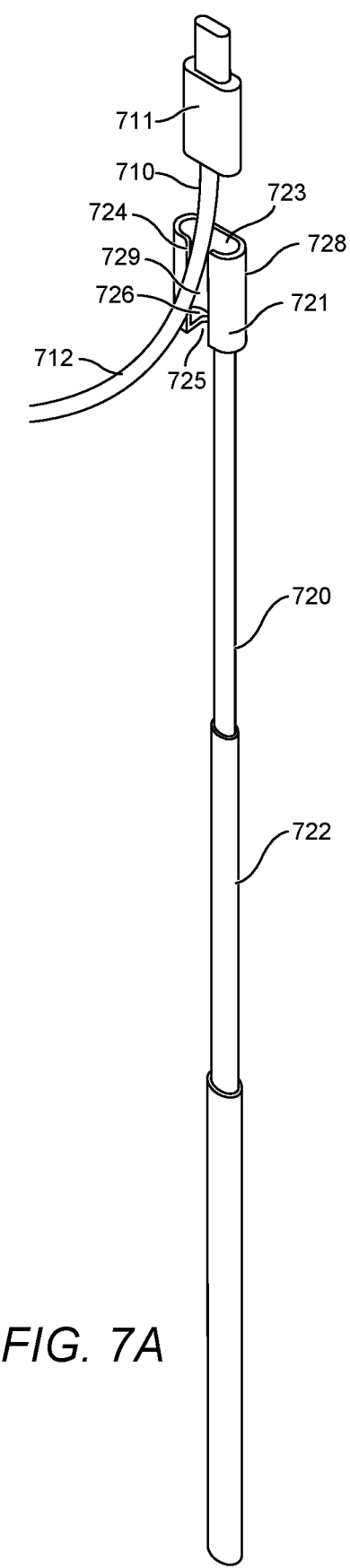

FIG. 7A illustrates a perspective view of a charging wand and a power adapter according to aspects of the embodiments.

Figure 7B:
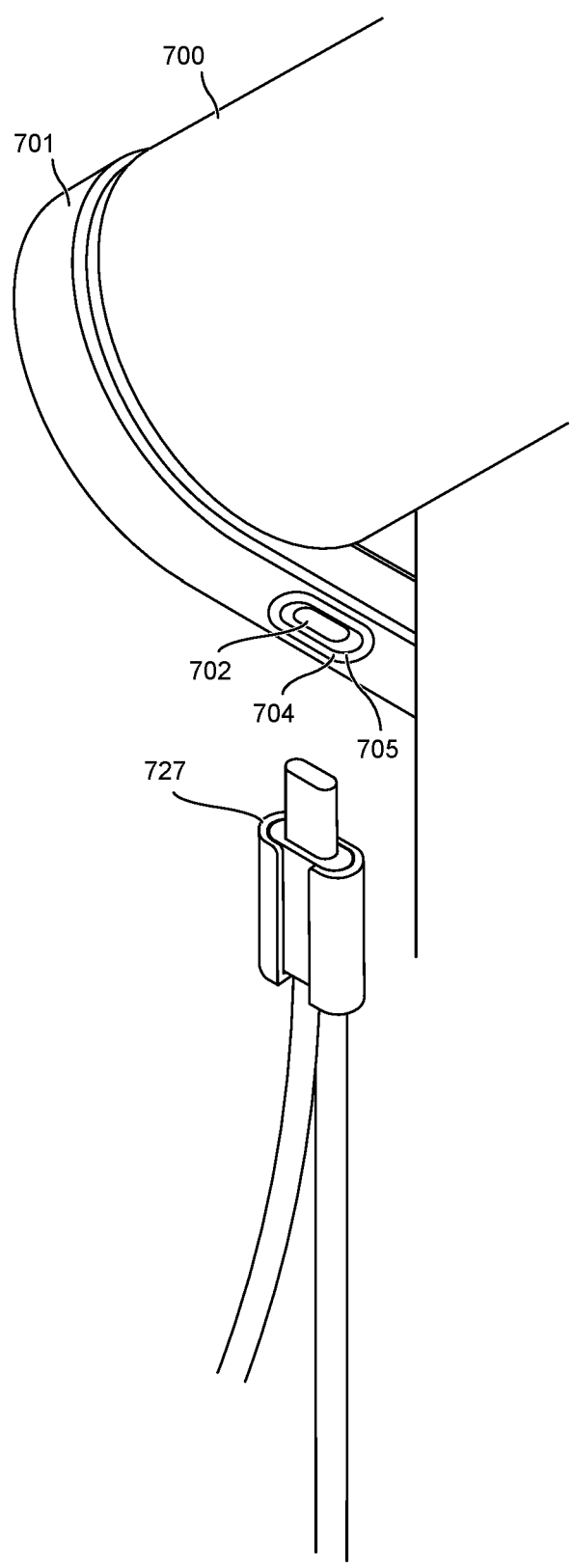

FIG. 7B illustrates a perspective view of a charging wand and a power adapter relative to a installation bracket and a roller shade assembly according to aspects of the embodiments.

Figure 7C:
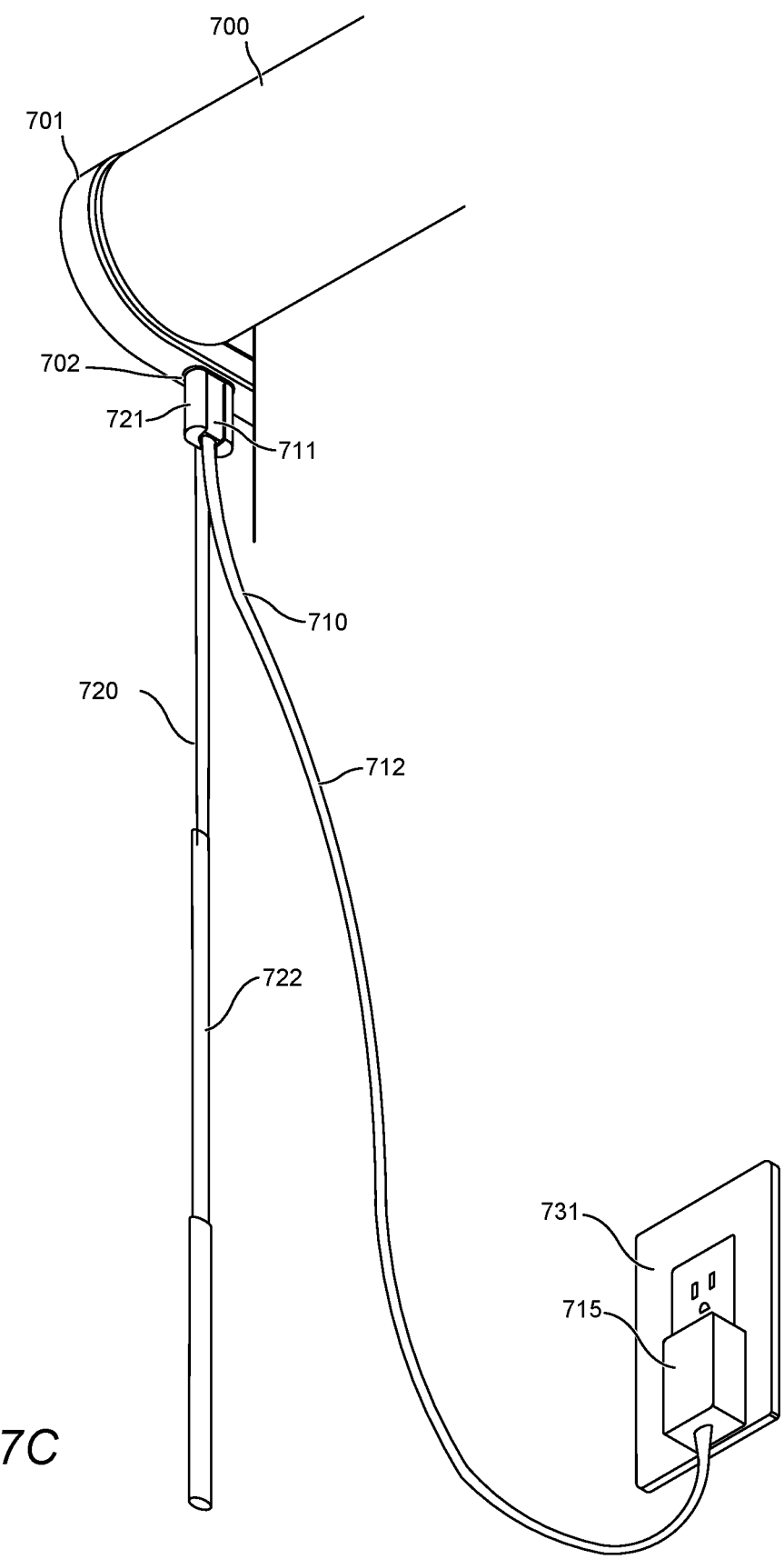

FIG. 7C illustrates a perspective view of a charging wand and a power adapter attached to the installation bracket relative to the roller shade assembly according to aspects of the embodiments.

Figure 8:
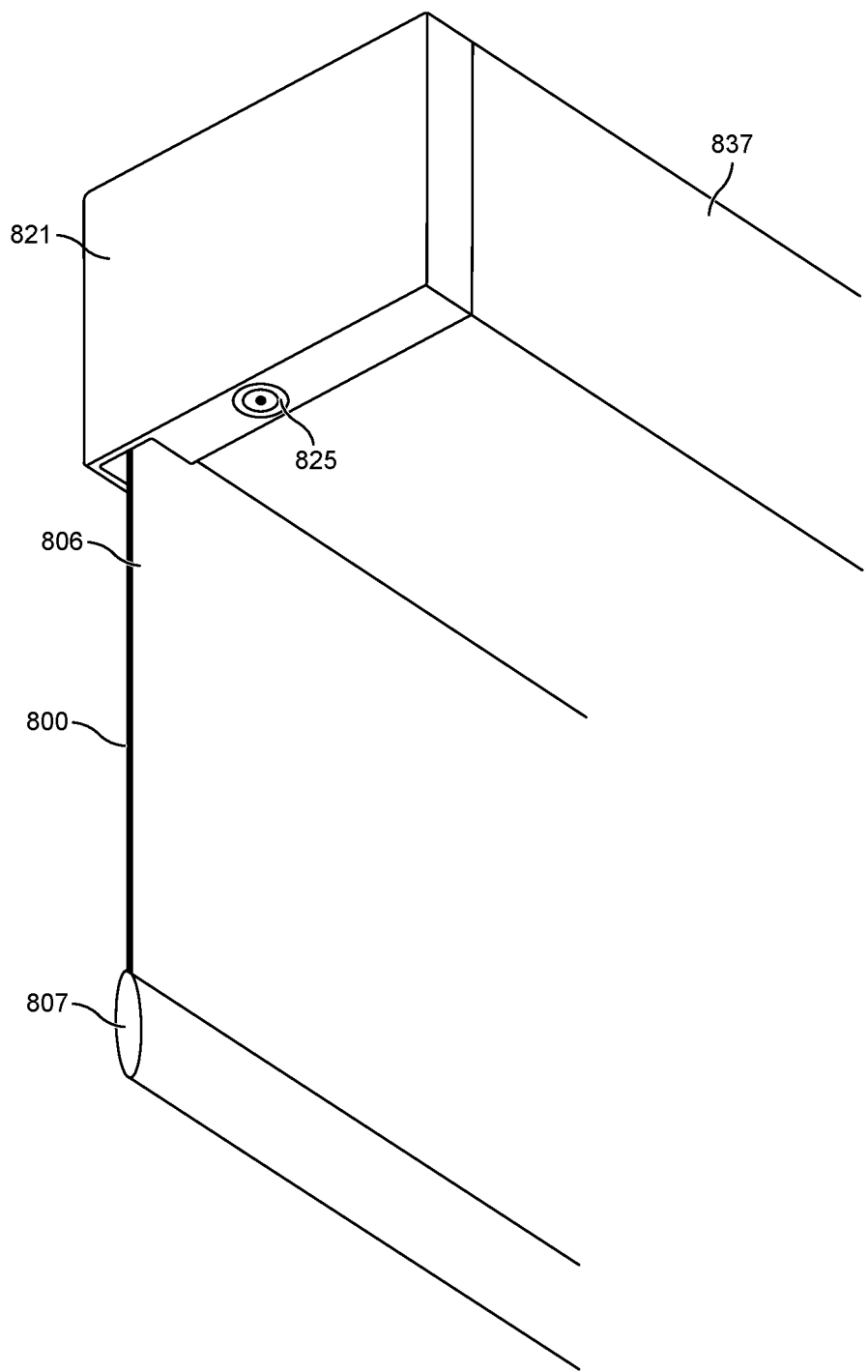

FIG. 8 illustrates a front perspective view of an installation bracket and a roller shade assembly according to another aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as motorized roller shades.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
  100 Roller Shade Assembly
  101 First Installation Bracket
  102 Second Installation Bracket
  103 Idler Assembly
  105 Roller Tube
  106 Shade Material
  107 Hem Bar
  109 Idler Body
  110 Motor Drive Unit
  111 Motor Housing
  112a First End
  112b Second End
  113 Battery
  114 Motor
  115 Idler Pin
  116 Motor Head
  117 Crown Adapter Wheel
  118 Drive Wheel
  119 Motor Control Module
  125 Installation bracket connector
  130 Power Adapter
  131 Power Adapter Connector
  132 Wire
  133 Transformer
  134 Electrical Plug
  135 Light Indicator/LED
  200 Block Diagram
  201 Controller
  204 Memory
  206 Wireless Interface
  211 Motor Head Interface
  212 Installation Bracket Interface
  213 Installation Bracket Module
  215 User Interface
  216 Light Indicator
  300 Roller Shade Assembly
  301 Installation Bracket
  302 Support Bracket
  303 Side Wall
  304 Rear Wall
  305 Mounting Holes
  306 Mounting Receptacles
  307 Mounting Plugs
  308 Screws
  310 Endcap Cover
  313 Outer Side Wall
  314 Inner Side Wall
  315 Peripheral Wall
  316 Inner Cavity
  317 Rear Opening
  318 Inner Side Opening
  321 Motor Head Interface/Terminal Block Socket
  326 Motor Head
  330 Power Adapter
  331 Power adapter connector 332 Installation Bracket Interface/Pluggable Terminal Block
325 Installation Bracket Connector/12V DC Power Port
334 Opening
337 Wire
400 Roller Shade Assembly
401 Installation Bracket
402 Support Bracket
403 Side Wall
404 Rear Wall
405 Mounting Holes
406 Mounting Receptacles
407 Mounting Plugs
408 Screws
409 Interface Member
410 Endcap Cover
411 Outer Cover Portion
412 Inner Cover Portion
413 Outer Side Wall
414 Inner Side Wall
415 Peripheral Wall
416 Inner Cavity
417 Rear Opening
418 Inner Side Opening
419 Side Wall
420 Rear Portion
421 Motor Head Interface/Electrical Contact Receptacles
422 Partial Ring
423 Partial Ring
424 Opening
425 Installation Bracket Connector/USB Type C Port
426 Motor Head
427 Pair of Side Rails
430 Power Adapter
431 Power Adapter Connector/USB Type C Connector
432 Installation Bracket Interface/Electrical Contact Pins
434 Opening
437 Electrical Connectors
438 Magnet
500 Roller Shade Assembly
501 Installation Bracket
502 Outer Side Wall
503 Peripheral Wall
504 Tabs
505 Rear Wall
506 Mounting holes
508 Screws
509 Installation Bracket Module/PCB
510 Housing
511 Front Portion
512 Rear Portion
515 First Portion
516 Second Portion
520 User Interface/Buttons
521 Electrical Contact Receptacles
522 Removable Cover
524 Locking Member
525 Installation Bracket Connector/USB Type C Port
526 Motor Head
527 Mounting Receptacle
528 Mounting Plug
530 Power Adapter
531 Power Adapter Connector
532 Electrical Spring Contacts
534 Opening
535 Opening
538 Electrical Contacts
539 Light Indicator/LED
545 Concealing Ring
600 Roller Shade Assembly
601 Installation Bracket
602 Outer Side Wall
603 Peripheral Wall
604 Tabs
605 Rear Wall
606 Mounting Holes
608 Interface Axis
609 Installation Bracket Module
610 Housing
611 Front Portion
612 Rear Portion
614a-d Contact Pads
615 First Portion
616 Second Portion
620 User Interface/Buttons
622 Removable Cover
623 Screws
624 Installation Bracket Locking Member
625 Installation Bracket Connector/USB Type C Port
626 Motor Head
627 Holes
628 Cutouts
629 Posts
630 Power Adapter
631 Power Adapter Connector
632 Center Hole
633 Center Hole
634 Opening
635 First Radius
636 Second Radius
637 Threaded Holes
638 Electrical Contacts
639 Center Post
641 Thumb lever
642a-b Locking Arms
644a-d Guiding Channels
645 Concealing Ring
646 Motor Head Receiving Area
655 Motor Head Locking Member
656 Locking Tabs
657a-d Pins
658 Third Radius
659 Locking Member Body
660 Locking Tab Receiving Area
700 Roller Shade Assembly
701 Installation Bracket
702 Installation Bracket Connector
704 Magnet
705 Opening
710 Power Adapter
711 Power Adapter Connector
712 Wire
715 Electrical Plug
720 Charging Wand
721 Retaining Head
722 Longitudinal Arm
723 Top Opening
724 Side Opening
725 Bottom Opening
726 Bottom Seat
727 Top End
728 Body
729 Inner Cavity
731 Receptacle 800 Roller Shade Assembly
806 Shade Material
807 Hem Bar
821 Installation Bracket
825 Installation Bracket Connector
837 Facia

LIST OF ACRONYMS USED IN THE
SPECIFICATION IN ALPHABETICAL ORDER

The following is a list of the acronyms used in the specification in alphabetical order.
ASIC Application Specific Integrated Circuit
IR Infrared
LED Light Emitting Diode
NFC Near Field Communication
PCB Printed Circuit Board
PoE Power over Ethernet
RAM Random-Access Memory
RF Radio Frequency
ROM Read-Only Memory
VAC Voltage Alternating Current
VDC Voltage Direct Current Mode(s) for Carrying Out Aspects of the Embodiments Disclosed herein are systems, methods, and modes for a battery-operated motorized roller shade that can be conveniently charged through an easily accessible and aesthetically pleasing installation bracket. Power can be provided through the bracket in a concealed as well as quick and easy detachable or releasable manner to the motorized battery-operated roller shade. The power supplying bracket provides an electrical interface that delivers electrical power to the batteries located within the roller tube of the roller shade.

While the different aspects of the embodiments described herein pertain to the context of roller shades, they are not limited thereto, except as may be set forth expressly in the appended claims. While the roller shade is described herein for covering a window, the roller shade may be used to cover other structures or architectural opening such as doors, wall openings, or the like. The embodiments described herein may further be adapted in other types of window or door coverings, such as inverted rollers, Roman shades, Austrian shades, pleated shades, blinds, shutters, skylight shades, garage doors, or the like.

Referring to FIG. 1, there is shown a perspective view of a roller shade assembly 100 according to one aspect of the embodiments. Shade assembly 100 is mounted to structure, such as a window frame, between first and second installation brackets 101 and 102. Shade assembly 100 generally comprises a roller tube 105, a motor drive unit 110, an idler assembly 103, shade material 106, and a hem bar 107. Shade material 106 extends between and is connected at its top end to the roller tube 105 and at its bottom end to the hem bar 107. Shade material 106 wraps around the roller tube 105 and is rolled onto and/or unrolled from the roller tube 105 to selectively uncover and/or cover a window, a door, a wall opening, or the like. In various embodiments, the shade material 106 comprises fabric, plastic, vinyl, or other materials known to those skilled in the art.

Roller tube 105 is generally cylindrical in shape and longitudinally extends from a first end 112a to a second end 112b. In various embodiments, the roller tube 105 comprises aluminum, stainless steel, plastic, fiberglass, or other materials known to those skilled in the art. The first end 112a of the roller tube 105 receives the motor drive unit 110, and the second end 112b of the roller tube 105 receives the idler assembly 103. The idler assembly 103 may comprise an idler body 109 rotating about an idler pin 115 disposed therein via one or more ball bearings. The idler body 109 is inserted into the second end 112b of the roller tube 105 and is operably connected to the roller tube 105 such that rotation of the roller tube 105 also rotates the idler body 109. The terminal end of the idler pin 115 is adapted to attach the roller shade assembly 100 to the second installation bracket 102.

The motor drive unit 110 may comprise a motor head 116, a crown adapter wheel 117, a drive wheel 118, and a motor housing 111 containing a motor control module 119, battery 113, and motor 114 therein. The motor drive unit 110 may be inserted into the toiler tube 105 through its first end 112a. The crown adapter wheel 117 and drive wheel 118 are generally cylindrical in shape and are operably connected to roller tube 105, for example through a plurality of channels that mate with complementary projections on the inner surface of the roller tube 105, such that crown adapter wheel 117, drive wheel 118, and roller tube 105 rotate together during operation. The crown adapter wheel 117 may be rotatably attached to the motor housing 111 via ball bearings therein. The crown adapter wheel 117 removably and releasably couples the motor drive unit 110 to the roller tube 105, for example via friction fit. The drive wheel 118 is operably connected to the output shaft of the motor 114 such that rotation of the output shaft rotates and drives the drive wheel 118.

In operation, the roller tube 105 is rotated via the motor drive unit 110 to roll or unroll the shade material 106 onto or from the roller tube 105. Particularly, the motor 114 drives the drive wheel 118, which in turn engages and rotates the roller tube 105. The roller tube 105, in turn, engages and rotates the crown adapter wheel 117 and idler body 109 with respect to the motor 114, while the motor housing 111, including the motor 114 and motor control module 119, remain stationary. As a result, the shade material 106 may be lowered from an opened or rolled up position, when substantially the entire shade material 106 is wrapped about the roller tube 105, to a closed or rolled down position, when the shade material 106 is substantially unrolled from the roller tube 105, and vice versa.

The first and second installation brackets 101 and 102 are adapted to be secured to a support surface, such as a window frame. The roller shade assembly 100 is then adapted to be removably mounted between the first and second installation brackets 101 and 102. The first installation bracket 101 is adapted to electrically interface with the motor head 116 of the motor drive unit 110 as discussed below to provide power to and recharge the battery 113 therein. According to an embodiment, the first installation bracket 101 is further adapted to interface with the motor head 116 of the motor drive unit 110 to transmit communication signals. Installation bracket 101 may further comprise a light indicator, such as a multicolor light emitting diode (LED) 135, for indicating the status of the motor drive unit 110, such as the battery status. The first installation bracket 101 further comprises an installation bracket connector 125 adapted to be connected to and interface with a power adapter connector 131 of a power adapter 130. The power adapter 130 comprises the power adapter connector 131 electrically connected to a transformer 133 via a wire 132. Transformer 133 may comprise or be connected to an electrical plug 134 adapted to connect to a power source, such as mains power source, to receive power.

According to an embodiment, controller (201, FIG. 2) of the motor drive unit 110 can monitor the state of the battery 113 and generate and transmit a battery state signal. The battery state signal can be transmitted to the installation bracket 101 through the interface between the motor head 116 and the installation bracket 101 and be displayed via the LED 135. For example, a red signal may be used to indicate that the battery 113 needs charging. When the battery 113 inside the roller shade 100 need to be recharged, the power adapter connector 131 may be connected to the installation bracket connector 125 to deliver electrical power to and recharge the battery 113 within the roller shade 100 through the electrical interface between the first installation bracket 101 and the motor head 116 as discussed below. When the battery 113 is fully charged, LED 135 may display a green blinking signal to indicate that the battery 113 has finished charging. Power adapter 130 may then be removed, which may turn off the LED 135.

Beneficially, the installation bracket connector 125 being integrated into the installation bracket 101, as opposed to in the motor head 116, is easily accessible to the user, aesthetically pleasing, and is easy to use. The installation bracket 101 provides a minimalistic appearance and does not require bulky shade housing. Additionally, the use of, and the removable interaction between the installation bracket 101 and the motor head 116 of the roller shade assembly 100 as a means for providing power and/or data signals minimizes damages to the roller shade assembly 100, including fabric 106, and can substantially reduce the light gap between the window frame and shade material 106. As those of skill in the art can appreciate, a light gap—the gap between the window frame and the shade—detracts from the ability of the shade system to effectively block light. That is, even if the shade material 106 itself is made from the most opaque of materials but there is a substantial light gap to either or both sides of shade 106, light can penetrate the room when not desired (e.g., the shades are all the way down). However, interconnection of the installation bracket 101 and the motor head 116 in the manner described herein to provide power and/or data signals to the shade motor controller eliminates or substantially reduces extraneous or spurious light from entering the room making the shade system more effective according to aspects of the embodiments. In addition, the roller shade assembly 100 may be later quickly and easily removed from the installation brackets 101 and 102 for maintenance, without causing any damage to the shade material 106.

According to an embodiment, the second installation bracket 102 may comprise a profile and outer design substantially similar to the first installation bracket 101 such that it is virtually indistinguishable from the first installation bracket 101. The second installation bracket 102, however, does not comprise an electrical interface between the bracket 102 and the roller shade 100. Instead, the second installation bracket 102 may comprise a keyhole adapted to retain the idler pin 115 of the idler assembly 103. The roller shade assembly 100 may be then mounted to the second installation bracket 102 by inserting the terminal end of the idler pin 115 into the keyhole in the second installation bracket 102.

Although the installation brackets 101 and 102 are shown as containing a semi-circular or C-shaped front portion, other shapes may be used such as square, rectangular, or the like. For example, referring to FIG. 8, there is shown an installation bracket 821 having a rectangular shape. Such bracket 821 may be used in cooperation with a facia 837 to cover the roller tube portion of the roller shade assembly 800 from view, while the shade material 806 and hem bar 807 may extend from the bottom end of the facia 837.

Referring now to FIG. 2, there is shown an illustrative block diagram 200 of the motor drive unit 110, the first installation bracket 101, and the power adapter 130 according to one embodiment. The motor drive unit 110 may comprise the motor 114, the motor control module 119, the battery 113, and a motor head interface 211. The battery 113 may comprise at least one rechargeable battery that provides power to the motor control module 119 and motor 114. According to one embodiment, battery 113 may comprise a rechargeable lithium battery pack and may comprise a single battery or a plurality of batteries. The first installation bracket 101 may comprise an installation bracket interface 212 electrically connected to an installation bracket connector 125. The motor head interface 211 is adapted to removably interface with the installation bracket interface 212, as described below, to receive power and/or data signals. According to one embodiment, the motor head interface 211 and the installation bracket interface 212 may interface via a plurality of pins and contact pads, as illustrated below. Although according to another embodiment, the motor head interface 211 and the installation bracket interface 212 may interface via an industry standard connectors, such as for example, USB ports (of various types, such as type A, type B, type C, or mini or micro versions thereof) power jack connectors (such as the 12V or 24V DC power connector), or other connectors known in the art that are capable of transmitting power.

The installation bracket connector 125 is in turn adapted to removably interface with the power adapter connector 131 of the power adapter 130. The installation bracket connector 125 and power adapter connector 131 can be plug and receptacle type connectors, respectively, or receptacle and plug type connectors, respectively, and may comprise proprietary or industry standard power and/or data connectors, such as for example various USB port types, power jack connectors (such as the 12V or 24V DC power connector), or other connectors known in the art that are capable of transmitting power. Power adapter 130 includes a plug 134 adapted to connect to a power supply, such as a 120 VAC mains power. Battery 113 may be recharged connecting the power adapter connector 131 with the installation bracket connector 125 and thereby receiving power from the power supply via the power adapter 130 and through installation bracket 101. Power adapter 130 may transmit the 120 VAC power directly to the motor head interface 211 via the first installation bracket 101, or it can convert and provide low voltage power, such as 24 VDC power, among other voltage levels, via the transformer 133. In yet another embodiment, the power adapter 130 can in addition or alternatively receive power from solar panels placed in proximity to the window to aggregate solar energy and charge the battery 113.

Motor control module 119 operates to control the motor 114, directing its operation, including direction, speed, and position. According to an embodiment, the motor control module 119 may comprise fully integrated electronics. In various embodiments, the motor control module 119 can comprise a controller 201 and memory 204. Controller 201 of the motor control module 119 can comprise one or more microprocessors, "general purpose" microprocessors, a combination of general and special purpose microprocessors, or application specific integrated circuits (ASICs). Controller 201 can provide processing capability to provide processing for operation of the motor 114. Memory 204 can be communicably coupled to the controller 201 and can store data and executable code. In another embodiment, memory 204 may be integrated with the controller 201. Memory 204 can represent volatile memory such as random-access memory (RAM), but can also include nonvolatile memory, such as read-only memory (ROM) or Flash memory.

According to one embodiment, the motor control module 119 can comprise a wireless interface 206 to allow remote control of the motor control module 119. Wireless interface 206 may be configured for bidirectional wireless communication with other electronic devices over a wireless network. In various embodiments, the wireless interface 206 can comprise one or more antenna and/or one or more transceivers, such as a radio frequency (RF) transceiver, an infrared (IR) transceiver, or other communication technologies known to those skilled in the art. In one embodiment, the wireless interface 206 communicates using the infiNET EX® protocol from Crestron Electronics, Inc. of Rockleigh, NJ In another embodiment, communication is employed using the ZigBee® protocol from ZigBee Alliance. In yet another embodiment, wireless interface 206 may communicate via Bluetooth transmission, IEEE 802.11.nn Wi-Fi communication system, near field communication (NFC) communication system, a cellular communication system, or via other communication technologies known in the art.

Data signals, such as control commands, received by the controller 201 from the wireless interface 206 (and/or from a wireless interface of the installation bracket module 213 discussed below) may be a direct user input to the controller 201 from a user interface, such as user interface 215, or a wireless signal from an external control point. For example, the controller 201 may receive a control command from a remote control or a wall-mounted button panel or a touch-panel in response to a button actuation or similar action by the user. Control commands may also originate from a signal generator such as a timer or a sensor. Accordingly, the motor control module 119 can integrate seamlessly with other control systems to be operated from keypads, wireless remotes, touch screens, and wireless communication devices, such as smart phones. Additionally, the motor control module 119 can be integrated within a large-scale building automation system or a small scale home automation system and be controllable by a central control processor, such as the PRO4 4-Series Control Processor available from Crestron Electronics, Inc., that networks, manages, and controls a building management system.

According to one embodiment, the first installation bracket 101 may contain simple configuration where the installation bracket interface 212 is electrically connected directly to the installation bracket connector 125. According to another embodiment, the first installation bracket 101 may comprise an installation bracket module 213 to provide additional functionality. For example, the installation bracket module 213 may comprise a wireless interface, similar to wireless interface 206, adapted to receive (or transmit) data signals and communicate same to the motor control module 119 via the motor head and installation bracket interfaces 211/212. The wireless interface of the installation bracket 101 may be configured to provide bidirectional communication with other devices over a wired network, for example to receive control commands from an external control point, such as a homeowner running an application on a smart phone.

According to another embodiment, the installation bracket module 213 can further comprise a user interface 215, such as buttons disposed on the first installation bracket 101, as described below, to provide commands to the motor control module 119 via the motor head and installation bracket interfaces 211/212. For example, using the user interface 215, a user can set up the motor drive unit 110 after installation in the field, such as to set the shade upper and lower limits and to connect the wireless interface 206 to a network. Furthermore, the installation bracket module 213 may comprise a light indicator 216, such as the LED 135 discussed above, for indicating the motor status. According to an embodiment, controller 201 can monitor the state of the battery 113 and generate and provide battery state signals via the light indicator 216.

FIGS. 3A-3B illustrate an assembly of installation bracket 101 in the form of installation bracket 301 according to one embodiment, where FIG. 3A illustrates a perspective inner view of the installation bracket 301 and FIG. 3B illustrates an exploded view of the installation bracket 301 relative to the roller shade assembly 300. Installation bracket 301 may comprise an L-shaped support bracket 302 having a side wall 303 orthogonally connected to rear wall 304. Rear wall 304 may include one or more mounting holes 305 adapted to receive screws (not shown) for securing the support bracket 302 to a structural surface, such as a wall or a window frame. Side wall 303 may comprise one or more mounting receptacles 306 which may work in concert with respective mounting plugs 307 disposed on the motor head 326 to secure roller shade assembly 300 to the support bracket 302. Mounting plugs 307 may be spring loaded to keep plugs 307 securely within mounting receptacles 306 or may be secured with screws 308. However, the mechanical connection between the roller shade assembly 300 and the support bracket 302 is not limited to the configuration shown in FIG. 3B and may comprise other configurations known in the art.

The installation bracket 300 may further comprise an endcap cover 310 adapted to removably connect to and at least partially cover the support bracket 302. Endcap cover 310 may comprise a decorative outer surface provided in a selection of a plurality of finishes to match the desired decor. Endcap cover 310 may comprise an inner cavity 316 formed within an outer side wall 313, a parallel inner side wall 314, and a peripheral wall 315 laterally extending between the outer side wall 313 and inner side wall 314. Endcap cover 310 further comprises a rear opening 317 and an inner side opening 318 in its inner side wall 313. Endcap cover 310 may further comprise an installation bracket connector 125, for example in the form of 12V DC power port 325. The installation bracket connector 325 can be retained within the inner cavity 316 of the endcap cover 310, by for example, tabs, snap-fits, fasteners, hooks, joints, or the like, and can be accessed through an opening 334 formed in the peripheral wall 316 of the endcap cover 310. Although the opening 334 can be formed in other exterior walls of the installation bracket, such as the outer side wall 313. Endcap cover 310 may further comprise an installation bracket interface 212 in the form of a pluggable terminal block 332. The installation bracket connector 325 may be electrically connected to the installation bracket interface 332 via a wire 337. The motor head 326 of the roller shade assembly 300 may comprise a motor head interface 211 in the form of a terminal block socket 321 adapted to receive and electrically interface with the pluggable terminal block 332.

During installation, the support bracket 302 may be installed to a support surface and the roller shade 300 may be connected to the support bracket 302 via screws 308. The pluggable terminal block 332 of the endcap cover 310 may be connected to the terminal block socket 321 of the roller 300 to form an electrical interface between the installation bracket connector 325 and the motor head 326. Endcap cover 310 can be connected over the support bracket 302 by inserting the side wall 302 of the support bracket 302 through the rear opening 317 and into the inner cavity 316. When the battery inside the roller shade 300 require recharging, the power adapter connector 331 of the power adapter 330 may be removably connected to the installation bracket connector 325 to deliver electrical power to the roller shade assembly 300 through wire 337 and the installation bracket and motor head interfaces 332 and 321.

FIGS. 4A-4B illustrate another exemplary embodiment of installation bracket 101 in the form of installation bracket 401, where FIG. 4A illustrates a perspective inner view of installation bracket 401 and FIG. 4B illustrates an exploded view of installation bracket 401 relative to the roller shade assembly 400. Installation bracket 401 may comprise an L-shaped support bracket 402 having a side wall 403 orthogonally connected to rear wall 404. Rear wall 404 may include one or more mounting holes 405 adapted to receive screws (not shown) for securing the support bracket 402 to a structural surface. Support bracket 402 may comprise an interface member 409 connected to the inner surface of the side wall 403 for interfacing with the roller shade 400 and the power adapter 430. Interface member 409 may comprise one or more mounting receptacles 406 extending therethrough, which may work in concert with respective mounting plugs 407 disposed on the motor head 426 to secure roller shade assembly 400 to the support bracket 402 via screws 408 or other means.

Interface member 409 of the support bracket 402 may comprise an installation bracket interface 212 in the form of a plurality of pins 432 extending from the interface member 409. Motor head 426 of the roller shade assembly 400 may comprise a motor head interface 211 in the form of a plurality of electrical contact receptacles 421. Pins 432 can be in the form of spring-loaded pins, commonly referred to as "pogo-pins", so that they can be kept in a compressive fitting with the electrical contact receptacles 421. Pins 432 can have different size springs with different spring constants, meaning that different amounts of force are required to compress them. In addition, such pins can have a number of different lengths, diameters, shapes, and head designs (the head being the portion that makes electrical contact), and can be rated for different amounts of voltage and current. Pins 432 fit within and electrically interface with a respective ones of the plurality of electrical contact receptacles 421 to provide power to the battery within the roller shade 400. The interface member 409 of the support bracket 402 may further comprise an installation bracket connector 125, which may be in the form of a USB type C port 425. Pins 432 may be connected to the installation bracket connector 425 via electrical connectors 437, such as a bus, metal contacts, wires or the like. According to an alternative embodiment, motor head 426 may comprise the electrical contract pins 432 and the installation bracket 401 may comprise the electrical contact receptacles 421.

Installation bracket 400 may further comprise a decorative endcap cover 410 adapted to removably connect to and substantially cover the support bracket 402. According to an embodiment, endcap cover 410 may comprise an outer cover portion 411 and an inner cover portion 412. The outer cover portion 411 may comprise an inner cavity 416 formed within an outer side wall 413, a parallel inner side wall 414, and a peripheral wall 415 laterally extending between the outer side wall 413 and inner side wall 414. Outer cover portion 411 further comprises a rear opening 417, an inner side opening 418 in its inner side wall 414, and a partial ring 422 extending from the inner side wall 414 and partially surrounding the inner side opening 418. The outer cover portion 411 may also comprise an opening 434 in its peripheral wall 415 through which the interface of the installation bracket connector 425 can be accessed when the outer cover portion 411 is mounted to the support bracket 402. According to a further embodiment, opening 434 of the outer cover portion 411 may comprise at least one magnet 438 that may be circumferentially disposed about the opening 434. Inner cover portion 412 may comprise a side wall 419, a rear portion 420 inwardly and orthogonally extending from the rear end of the side wall 419, a partial ring 423 outwardly extending from the front end of the side wall 419, and a pair of side rails 427 therebetween.

During installation, the support bracket 402 is installed to a support surface and the roller shade 400 is connected to the support bracket 402 by inserting the mounting plugs 407 of the motor head 426 into the mounting receptables 406 in the interface member 409 and further by securing via screws 408. Thereby, mounting plugs 407 cooperate with the mounting receptacles 406 to align the motor head 426 with the interface member 409 and cause the pins 432 to be inserted within and electrically interface with the electrical contact receptacles 421. Then, the endcap cover 410 can be connected to the support bracket 402 by first connecting the inner cover portion 412 to the inner surface of the support bracket 402 and sliding the outer cover portion 411 over the support bracket 402 and over the rails 427 of the inner cover portion 412. The outer cover portion 411 and the inner cover portion 412 may further comprise an interlocking means therein, such as tabs, snap-fits, fasteners, hooks, joints, or the like. According to an embodiment, the outer and inner cover portions 411 and 412 interact such that the support bracket 402 is substantially covered and substantially a full ring is formed by the partial rings 422 and 423 with an opening 424 (FIG. 4A) adapted to contain and substantially cover the motor head 426 of the roller shade 400.

When the battery inside the roller shade 400 need to be recharged, the power adapter connector 431 of the power adapter 430, which may comprise a USB type C connector, may be connected to the installation bracket connector 425 to deliver electrical power to and recharge the battery within the roller shade 400 through electrical connectors 437 and the electrical contact pins 432 and electrical contact receptacles 421. According to an embodiment, the power adapter connector 431 may be further retained within the installation bracket connector 425 via the magnet 438.

Referring to FIGS. 5A-5B there is shown yet another exemplary embodiment of installation bracket 101 in the form of installation bracket 501, where FIG. 5A illustrates a perspective inner view of installation bracket 501 and FIG. 5B illustrates an exploded view of installation bracket 501 relative to the roller shade assembly 500. According to this embodiment, installation bracket 501 may comprise an L-shaped housing 510 with an outer surface that can be available in a selection of a plurality of decorative finishes. Housing 510 may comprise an outer side wall 502 and a peripheral wall 503 laterally and inwardly extending about a top end, front end, and bottom end of the side wall 502. Housing 510 may further comprise a rear wall 505 inwardly extending from a rear end of the side wall 502 and connected to the edges of the peripheral wall 503. Housing 510 may further comprise a pair of tabs 504 inwardly extending from the peripheral wall 503 at about the center of the side wall 502. The pair of tabs 504 cooperate with the peripheral wall 503 to form a substantially ring-shaped front portion 511 and a substantially rectangular rear portion 512, although other shapes may be used. The rear wall 505 may include one or more mounting holes 506 adapted to receive screws (not shown) for securing the installation bracket 501 to a structural surface.

Installation bracket 501 may further comprise an installation bracket module 213, for example in the form of a printed circuit board (PCB) 509, for providing the installation bracket interface 212 and the motor head interface 211. Installation bracket module 509 may comprise a first portion 515 connected to a second portion 516. Although a single PCB is illustrated for the installation bracket module 509, two or more PCBs may be used. First portion 515 may comprise a substantially disc shape dimensioned and sized to fit and reside within the front portion 511 of housing 510. Second portion 516 may be dimensioned and sized to fit and reside within the rear portion 512 of housing 510. Installation bracket module 509 may be retained within the housing 510 via screws 508. A removable cover 522 may be provided to cover the second portion 516 of the installation bracket module 509 from view.

Installation bracket module 509 may also comprise a substantially disc shaped locking member 524 connected to the front portion 515 and sized to substantially reside within the front portion 511 of housing 510. Locking member 524 may comprise a keyed mounting receptacle 527. The keyed mounting receptacle 527 may be adapted to house the installation bracket interface 212 in the form of a plurality of electrical spring contacts 532 disposed about its inner perimeter. According to an embodiment, electrical spring contacts 532 may comprise four contacts, two for power and two for data signals. Motor head 526 may comprise a mounting plug 528 extending from a terminal end thereof and sized and shaped to fit within and removably attach to the keyed mounting receptacle 527. Mounting plug 528 may comprise the motor head interface 211 in the form of electrical contact receptacles 521 disposed about its outer perimeter. According to an embodiment, electrical spring contacts 532 are adapted to lock the mounting plug 528 within the mounting receptacle 527 and also provide an electrical interface between the installation bracket module 509 and the roller shade 500. Electrical contact receptacles 521 are electrically connected to the motor control module 119 within the roller shade 500 to provide power and/or data signals. For example, four electrical contact receptacles 521 may be used, two for power and two for data signals. According to an alternative embodiment, the mounting receptacle 527 may comprise the electrical contact receptacles 521 and the mounting plug 528 may comprise the electrical spring contacts 532.

The second portion 516 of the installation bracket module 509 may house the installation bracket connector 125, for example in the form of a USB type C port 525. Installation bracket connector 525 is adapted to be electrically connected to electrical spring contacts 532, for example via a plurality of electrical contacts 538 in the PCB, to receive power via ground and hot power signals and data via first data signal and a second data signal for bidirectional data communication. Although other number of contacts may be used. Installation bracket 501 may comprise an opening 534 in its peripheral wall 503 through which the interface of the installation bracket connector 525 can be accessed.

The second portion 516 of the installation bracket module 509 may also house the user interface 215 in the form of a plurality of buttons 520. According to one embodiment, buttons 520 may be accessed by removing the removable cover 522. According to another embodiments, the removable cover 522 or a non-removable housing wall may be provided with holes through which the buttons 520 may extend. Buttons 520 may be electrically connected to at least one electrical spring contact 532 to transmit data signals to the controller 201 for configuring and controlling different aspects of operation of the motor 114 according to aspects of the embodiments. For example, an "Up" button can command the controller 201 to operate the motor 114 to raise the shade material 106, a "Down" button to lower the shade material 106, and a "Set" button to set operating limits, such as an upper limit and a lower limit. Additional buttons can be included, for example to increase/decrease the rate of rotation of motor 114, or perform other functions, according to further aspects of the embodiments. In addition, or alternatively to the buttons 520, port 525 may be used to connect to a configuration device with buttons that can be plugged into port 525 for situations where buttons 520 cannot be easily accessed or not provided. Second portion 516 of the installation bracket module 509 may also house the light indicator 216, for example in a form of an LED 539, electrically connected to one of the electrical spring contacts 532 for receiving data signals from the controller 201 and providing visual indication to the user, for example to indicate that the battery needs to be recharged and/or that the battery has finished charging. Installation bracket 501 may comprise an opening 535 in its peripheral wall 503 through which the LED 539 may illuminate.

The installation bracket 501 may further comprise a full or partial concealing ring 545 which may be removably or permanently secured about the front portion 511 of the installation bracket 501. According to an alternative embodiment, the concealing ring 545 may be removably or permanently secured about the end of the motor head 526. Concealing ring 545 is adapted to conceal the components of the motor head interface 211 disposed on the motor head 526 and the components of the installation bracket interface 212 disposed on the installation bracket 501.

During installation, the installation bracket 501 may be mounted to a structure. The roller shade 500 may be then mounted to the installation bracket 501 by inserting the mounting plug 528 of the motor head 526 into the mounting receptacle 527 of the installation bracket 501 where it is locked therein. This causes the electrical spring contacts 532 to electrically interface with and engage the electrical contact receptacles 521 such that power and/or data signals can then travel between the installation bracket 501 and the roller shade 500. When the battery inside the roller shade 500 need to be recharged, the power adapter connector 531 of the power adapter 530, which may comprise a USB type C connector, may be connected to the installation bracket connector 525 to deliver electrical power to and recharge the battery within the roller shade 500 through connectors 538, electrical spring contacts 532, and the electrical contact receptacles 521.

FIGS. 6A-6C illustrate another embodiment of installation bracket 101 in the form of installation bracket 601, where FIG. 6A illustrates a perspective inner view of installation bracket 601, FIG. 6B illustrates an exploded view of installation bracket 601 relative to the roller shade assembly 600, and FIG. 6C illustrates a cross sectional view of the motor head 626 of the roller shade 600 connected to the installation bracket 601. Installation bracket 601 comprises housing 610 of similar configuration to housing 510 in FIGS. 5A-5B, having an outer side wall 602, laterally extending peripheral wall 603, a lateral rear wall 605 with mounting holes 606, and a pair of tabs 604 that form a substantially ring-shaped front portion 611 and a substantially rectangular rear portion 612. According to an embodiment, front portion 611 is centered about an interface axis 608.

Installation bracket 601 may further comprise an installation bracket module 213, for example in a form of PCB 609, for providing the installation bracket interface 212 and the installation bracket connector 125. Installation bracket module 609 may comprise a first portion 615 sized to fit within the front portion 611 of housing 601 and a second portion 616 sized to fit within the rear portion 612 of housing 601. The first PCB portion 615 may be adapted to house the installation bracket interface 212, particularly in the form of at least one set of contact pads 614a-d. According to an embodiment, eight sets of contact pads 614a-d may be provided. Although in other embodiments, other number of sets of contact pads may be provided, including for example a single set of contact pads 614a-d, four sets of contacts pads 614a-d, or the like. Each set of contact pads 614a-d may comprise a number of pads corresponding to the number of connections required to provide power and/or data signals. For example, for both power and data signals, four contact pads 614a, 614b, 614c, and 614d may be provided in each set, two for power and two for data signals. According to an embodiment, contact pads 614a-d in each set are linearly arranged along a radius at different distances with respect to the interface axis 608. For example, contact pads 614a-d in one set may be aligned along a first radius 635 of the first portion 615 and contact pads 614a-d in another set may be aligned along a second radius 636 of the first portion 615.

The second PCB portion 616 may house the installation bracket connector 125, for example in the form of a USB type C port 625 electrically connected to respective contact pads 614a-d, for example via a plurality of electrical contacts 638 in the PCB 609 to receive power via ground and hot power signals and data via first data signal and a second data signal for bidirectional data communication. Installation bracket 601 may comprise an opening 634 in its peripheral wall 603 through which the interface of the installation bracket connector 625 can be accessed. A removable cover 622 may be provided to cover the second portion 616 of the installation bracket module 609 from view. The second portion 616 may also house the user interface 215 in the form of a plurality of buttons 620, which may be accessed by removing the removable cover 622. Buttons 620 may be electrically connected to at least one contact pad 614a-d to transmit data signals to the controller 201 for configuring and controlling different aspects of operation of the motor 114 according to aspects of the embodiments as discussed with reference to FIGS. 5A-5B above.

To removably engage the motor head 626, installation bracket 601 may comprise a substantially disc-shaped locking member 624. Locking member 624 may be sized to substantially reside within the front portion 611 of the installation bracket housing 601 and over the first PCB portion 615 such that its center is aligned with the interface axis 608. Locking member 624 may be secured to the housing 601 of the installation bracket 601 using a pair of screws 623 extending through holes 627 in the locking member 624 and threadably secured to threaded holes 637 in respective posts 629 traversely extending from the inner surface of outer side wall 602 of the installation bracket housing 601. First PCB portion 615 may comprise a pair of cutouts or holes 628 adapted to receive the posts 629 of the installation bracket housing 601 such that the first portion 615 is properly aligned with the interface axis 608. For further alignment, the front portion 611 of the installation bracket 601 may comprise a center post 639 extending from the inner surface of the outer side wall 602 at the interface axis 608, which is adapted to be received within a center hole 632 of the first portion 615 of module 609 and a center hole 633 of the locking member 624 to align the front portion 611 of housing 601, first portion 615 of module 609, and the locking member 624 with respect to the interface axis 608. Additional or fewer posts may also be provided.

According to an embodiment, the locking member 624 may comprise a thumb lever 641 adapted to retain the removable cover 622, although other mechanisms may be used which may be located directly on the installation bracket housing 601. The thumb lever 641 may be pulled back to detach and remove the removable cover 622 to give access to buttons 620.

The locking member 624 may further comprise a plurality pairs of symmetrical locking arms, such as arms 642a and 642b. According to various embodiments, locking member 624 may comprise a single locking arm (e.g., 642a), one pair of symmetrical locking arms (e.g., 642a-b), or a plurality of pairs of locking arms (such as four pairs as illustrated in the figures). Locking arms 642a-b may transversely extend out of the locking member 624 in proximity to the periphery of the locking member 624 forming a motor head receiving area 646 therebetween at the center of the locking member 624. Each locking arm 642a-b may comprise a substantially "L" shaped body, for example in a form of a "hook". Each pair of locking arms 642a-b may have the two "L" shaped bodies symmetrically facing each other and adjacently disposed to form a locking tab receiving area 660 therebetween. The first locking arm 642a may be aligned with the first radius 635 and the second locking arm 642b may be aligned with the second radius 636.

In addition, locking member 624 may comprise a plurality of sets of guiding channels 644a-d disposed within the motor head receiving area 646 and traversing the locking member 624. The guiding channels 644a-d in each set may be linearly aligned and disposed at different distances with respect to the interface axis 608. According to an embodiment, each guiding channel may be aligned with, extending, and disposed over two respective contact pads of two adjacent sets. For example, channel 644d may extend between contact pad 614d of one set at first radius 635 and contact pad 614d of another set at a second radius 636. Each guiding channel may be curved and extend from the first radius 635 to the second radius 636. In the embodiment shown in the figures, four guiding channels 644a-d may be provided for every pair of adjacently disposed sets of contact pads 614a-d.

Installation bracket 601 may further comprise a concealing ring 645 which may be removably or permanently secured about the front portion 611 of the installation bracket 601. According to an alternative embodiment, the concealing ring 645 may be removably or permanently secured about the end of the motor head 626. The concealing ring 645 is adapted to conceal the components of the motor head interface disposed on the motor head 626 and the components of the installation bracket interface disposed on the installation bracket 601.

Motor head 626 may comprise a motor head locking member 655 extending from its terminal end. Motor head locking member 655 comprises the motor head interface 211 and is adapted to removably attach to the installation bracket locking member 624. Motor head locking member 655 may comprise a disc shaped body 659 sized to fit within the motor head receiving area 646 in the motor head locking member 624. Motor head locking member 655 may further comprise one or more locking tabs 656, for example four locking tabs, traversely extending from the side surface of the locking member body 659. Each locking tab 656 is adapted to be received and locked by one of the locking arms 642a-b of the symmetric pairs of locking arms. Motor head locking member 655 may further comprise a plurality of pins 657a-d extending from its terminal end. Pins 657a-d can be in the form of spring-loaded pins, commonly referred to as "pogo-pins", so that they can be kept in a compressive fitting with contact pads 614a-d. Pins 657a-d can have different size springs with different spring constants, meaning that different amounts of force are required to compress them. In addition, such pins can have a number of different lengths, diameters, shapes, and head designs (the head being the portion that makes electrical contact), and can be rated for different amounts of voltage and current. Pins 657a-d comprise the motor head interface 211 and are connected to the motor control module 119 to provide power and/or data signals. For example, four pins 657a-d may be used, two for power and two for data signals. Pins 657a-d may be linearly arranged along a third radius 658 on the terminal end of the motor head locking member 655, each at a different distance with respect to the interface axis 608. According to an embodiment, pins 657a-d are linearly arranged with one of the locking tabs 656 such that said locking tab 656 is also arranged along the third radius 658.

During installation, installation bracket 601 is mounted within a window frame or onto the wall in front of the window frame at an uppermost position of about window as known to those of skill in the art. The roller shade assembly 100 may be then mounted to the installation bracket 601 by aligning and inserting the locking tabs 656 into the locking tab receiving areas 660 between respective pairs of locking arms 642a-b. This causes the disc shaped motor head locking member body 659 to be inserted into the motor head receiving area 646 of the locking member 655 and the pogo pins 657a-d to be inserted into respective guiding channels 644a-d. The roller shade assembly 600 may be then rotated in either direction, to bring each locking tab 656 towards a respective first locking arm 642a or towards a respective second locking arm 642b until the locking tab 656 is locked by the first locking arm 642a or the second locking arm 642b. This also causes each pin 657a-d to travel within a respective guiding channel 644a-d until it comes into contact with a respective contact pad 614a-d in a first set along radius 635 or with a respective contact pad 614a-d in a second set along radius 636, depending on the direction of rotation of the roller shade assembly 600. Power and/or data signals can then travel between contacting pins 657a-d and respective contact pads 614a-d.

According to an embodiment, the roller shade assembly 600 is rotated toward the side from which the shade material 106 hangs. As such, the lock direction is dictated by the direction of the pull of the shade material 106. This ensures that the roller shade assembly 600 does not get dislodged from the installation bracket 601, if for example someone pulls on the shade material 106 or the hem bar 107. Instead, pulling on the shade material 106 or hem bar 107 further locks the motor head locking member 365 with the installation bracket locking member 624.

In a preferred embodiment, at least two oppositely disposed symmetric pairs of locking arms 642a-b, two oppositely disposed locking tabs 656, and two oppositely disposed pairs of contact pads 614a-d are provided for optimal operation. This allows the roller shade assembly 600 to be installed with the motor drive unit 110 on the right side of the roller tube 105 or on the left side of the roller tube 105, or with the shade material 106 in a regular roll configuration (where the shade material 106 rolls off the rear end of the roller shade assembly 100 as shown in FIG. 1), or in a reverse roll configuration (where the shade material 106 rolls off the front end of the roller shade assembly). However, other number of corresponding locking arms, locking tabs, and contact pads may be implemented. For example, only two of the first locking arms 642a and two locking tabs 656 may be provided in a roller shade assembly 600 that is adapted to be installed with the motor on only one side and for only one type of shade material roll direction.

When the battery inside the roller shade 600 need to be recharged, the power adapter connector 631 of the power adapter 630, which may comprise a USB type C connector, may be connected to the installation bracket connector 625 to deliver electrical power to and recharge the battery within the roller shade 600 through connectors 638, contact pads 614a-d, and the pogo pins 657a-d.

Referring to FIGS. 7A-7C, there is shown an embodiment of a charging wand 720, power adapter 710, and installation bracket 701 according to an illustrative embodiment. In installations where the roller shade assembly 700 is installed in tall windows or other hard-to-reach location, charging wand 720 may be facilitated to provide an extension for connecting the power adapter connector 711 to the installation bracket connector 702 in the installation bracket 701. Charging wand 720 may comprise a retaining head 721 connected to a longitudinal arm 722. Retaining head 721 is adapted to removably retain the power adapter connector 711 therein. Arm 722 provides the necessary extension for allowing the power adapter connector 711 to reach and connect to the installation bracket connector 702. Arm 722 may comprise a plurality of telescoping members such that arm 722 can be extended to a greater length.

According to an embodiment, power adapter connector 711 may be removably retained by the charging wand 720. Yet according to an alternative embodiment, power adapter connector 711 may be integrated with and not be removable from the charging wand 720. Retaining head 721 may comprise a body 728 comprising an inner cavity 729 therein and having a top opening 723, a side opening 724, a bottom opening 725, and a bottom seat 726 within the inner cavity 729. Power adapter connector 711 may be inserted through the top opening 723, into the inner cavity 729 and rest against the bottom seat 726. The interface of the power adapter connector 711 may extend from the top opening 723 of the retaining head 721. Wire 712 of the power adapter 710 may be inserted through the side opening 724 and exit through the bottom opening 725 of the retaining head 721. According to an alternative embodiment, retaining head 721 may comprise a clip adapted to clip to a side of the power adapter connector 711.

According to one embodiment, after connecting the power adapter connector 711 to the installation bracket connector 702, charging wand 720 can be removed and used to assist in charging other roller shades. According to another embodiment, installation bracket 701 may comprise a magnet 704 or a plurality of magnets circumferentially disposed around the opening 705 in the installation bracket 701 that provides access to the installation bracket connector 702. The retaining head 721 of the charging wand 720 may comprise a ferromagnetic metal material such that it can be removably attached to the magnet 704. Although according to various embodiment, retaining head 721 may comprise a metallic or magnetic surface or member at its top end 727 adapted to connect to the magnet 704; and/or the retaining head 721 may contain one or more magnets at its top end 727 and the installation bracket opening 705 may comprise a metallic member surrounding the bracket opening 705, such as a ring or an oval. This allows the charging wand 700 to be attached to the installation bracket 701 to both assist inserting and retaining the power adapter connector 711 in the installation bracket connector 702.

When the battery inside the roller shade 700 needs recharging, the power adapter connector 711 can be inserted in the retaining head 721 of the charging wand 720. Arm 722 of the charging wand 720 can be extended, and the power adapter connector 711 can be aligned with and inserted into the installation bracket connector 702. The magnet 704 can couple to the top end 727 of the power adapter connector 711 such that the wand 720 can remain hanging from the installation bracket 701. The electrical plug 715 can then be plugged into a receptacle 731. After the battery is done charging, the wand 720 can be used to pull and disconnect the power adapter connector 711 from the installation bracket connector 702.

INDUSTRIAL APPLICABILITY

To solve the aforementioned problems, the disclosed embodiments provide systems, methods, and modes for a battery-operated motorized roller shade that can be conveniently charged through an easily accessible and aesthetically pleasing installation bracket. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A shade assembly comprising:
a roller tube;
a shade material connected to the roller tube;
a motor disposed inside the roller tube and adapted to rotate the roller tube to roll and unroll the shade material;
a motor head disposed at a terminal end of the roller tube and comprises a motor head interface, wherein the motor head is stationary with respect to the installation bracket when the roller tube rotates;
at least one battery disposed inside the roller tube and electrically connected to the motor and to the motor head interface; and
an installation bracket adapted to be secured to an architectural structure and comprises an installation bracket interface electrically connected to an installation bracket connector, wherein the installation bracket interface is adapted to removably connect to and electrically interface with the motor head interface, wherein the installation bracket connector is adapted to removably connect to and electrically interface with a power adapter;
wherein the motor head is adapted to removably attach to the installation bracket and wherein the installation bracket is adapted to provide electrical power to the at least one battery when the installation bracket is connected to the power adapter.

2. The shade assembly of claim 1, wherein the motor head interface comprises a plurality of pins and wherein the installation bracket interface comprises a plurality of contact pads or receptacles.

3. The shade assembly of claim 1, wherein the motor head interface comprises a plurality of contact pads or receptacles and wherein the installation bracket interface comprises a plurality of pins.

4. The shade assembly of claim 1, wherein the motor head interface and installation bracket interface comprise a plug and receptacle interface.

5. The shade assembly of claim 4, wherein the plug and receptacle interface comprise at least one of a USB interface, a power jack interface, and a terminal block interface.

6. The shade assembly of claim 1, wherein the motor head comprises a first locking member and the installation bracket comprises a second locking member, wherein the motor head is adapted to removably attach to the installation bracket by connecting the first locking member to the second locking member and thereby aligning and electrically connecting the motor head interface with the installation bracket interface.

7. The shade assembly of claim 6, wherein the first locking member comprises at least one mounting plug and wherein the second locking member comprises at least one mounting receptacle.

8. The shade assembly of claim 6, wherein the second locking member comprises a keyed mounting receptacle and wherein the first locking member comprises at a mounting plug sized and shaped to fit within the keyed mounting receptacle.

9. The shade assembly of claim 8, wherein the motor head interface comprises a plurality of electrical contacts disposed about an outer perimeter of the mounting plug, and wherein the installation bracket interface comprise a plurality of electrical contacts disposed about an inner perimeter of the keyed mounting receptacle.

10. The shade assembly of claim 6, wherein the first locking member comprises a disc shaped body and wherein the second locking member comprises a disc shaped receiving area sized to receive the disc shaped body of the first locking member.

11. The shade assembly of claim 6, wherein the motor head is adapted to removably attach to the installation bracket by aligning the first locking member with the second locking member and rotating the roller tube until the first locking member is locked by the second locking member.

12. The shade assembly of claim 1 further comprising a controller disposed inside the roller tube and electrically connected to the battery and the motor head interface, wherein the controller is adapted to monitor the battery and transmit a battery state signal, wherein the installation bracket further comprises a light indicator adapted to illuminate a battery state based on receiving the battery state signal.

13. The shade assembly of claim 1 further comprising a controller disposed inside the roller tube and electrically connected to the battery and the motor head interface, wherein the installation bracket further comprises a user interface, wherein the controller receives data signals from the user interface through the motor head interface and the installation bracket interface.

14. The shade assembly of claim 1, wherein the installation bracket connector comprises a receptacle.

15. The shade assembly of claim 14, wherein the receptacle comprises at least one of a USB receptacle and a power jack receptacle.

16. The shade assembly of claim 1, wherein the installation bracket comprises an outer side wall and a peripheral wall laterally extending from the outer side wall, wherein the peripheral wall comprises an opening through which the installation bracket connector is accessed.

17. The shade assembly of claim 16, wherein the opening comprises a magnet adapted to removably connect the power adapter to the power adapter connector of the installation bracket.

18. The shade assembly of claim 16, wherein the installation bracket comprises a rear wall laterally extending from a rear end of the outer side wall, wherein the rear wall is adapted to be secured to the architectural structure.

19. The shade assembly of claim 18, wherein the installation bracket comprises a support bracket and an endcap cover, wherein the endcap cover comprises the outer side wall and the peripheral wall, and wherein the support bracket comprises a side wall and a rear wall laterally extending from a rear end of the side wall, wherein the rear wall is adapted to be secured to the architectural structure and wherein the side wall is adapted to removably attach to and support the motor head.

20. A shade assembly comprising:
a shade drive unit adapted to raise and lower shade material, the shade drive unit comprising a motor, at least one battery electrically connected to the motor, and a motor head disposed at a terminal end of the shade drive unit, wherein the motor head comprises a first locking member and a motor head interface; and
an installation bracket adapted to be secured to an architectural structure and comprising a second locking member, an installation bracket interface, and a peripheral wall comprising an installation bracket connector electrically connected to the installation bracket interface, wherein the installation bracket connector is adapted to removably connect to and electrically interface with a power adapter;
wherein the motor head is adapted to removably attach to the installation bracket by connecting the first locking member to the second locking member and thereby aligning and electrically connecting the motor head interface with the installation bracket interface, and wherein the installation bracket is adapted to provide electrical power to the at least one battery when the installation bracket is connected to the power adapter.

21. A roller shade assembly comprising:
a roller shade adapted to raise and lower shade material comprising a roller tube, a motor and at least one battery disposed within the roller tube, and a motor head disposed at a terminal end of the roller tube, wherein the motor head comprises a first locking member and a motor head interface; and
an installation bracket adapted to be secured to an architectural structure and comprising a second locking member, an installation bracket interface, and an exterior wall comprising an installation bracket connector electrically connected to the installation bracket interface, wherein the installation bracket connector is adapted to removably connect to and electrically interface with a power adapter;
wherein the motor head is adapted to removably attach to the installation bracket by connecting the first locking member to the second locking member and thereby aligning and electrically connecting the motor head interface with the installation bracket interface, wherein the installation bracket is adapted to provide electrical power to the at least one battery when the installation bracket is connected to the power adapter, and wherein the motor head is stationary with respect to the installation bracket when the roller tube rotates.

* * * * *